United States Patent
Sørensen et al.

(10) Patent No.: US 12,514,433 B2
(45) Date of Patent: Jan. 6, 2026

(54) TIP PART FOR FORMING A TIP OF A DISPOSABLE INSERTION ENDOSCOPE

(71) Applicant: AMBU A/S, Ballerup (DK)

(72) Inventors: Morten Sørensen, Ballerup (DK); Lasse Markworth Johnsen, Birkerød (DK)

(73) Assignee: AMBU A/S, Ballerup (DK)

( * ) Notice: Subject to any disclaimer, the term of this patent is extended or adjusted under 35 U.S.C. 154(b) by 501 days.

(21) Appl. No.: 17/794,743

(22) PCT Filed: Nov. 26, 2020

(86) PCT No.: PCT/EP2020/083525
§ 371 (c)(1),
(2) Date: Jul. 22, 2022

(87) PCT Pub. No.: WO2021/151551
PCT Pub. Date: Aug. 5, 2021

(65) Prior Publication Data
US 2023/0054149 A1 Feb. 23, 2023

(30) Foreign Application Priority Data

Jan. 28, 2020 (EP) .................................... 20153967

(51) Int. Cl.
*A61B 1/00* (2006.01)
*A61B 1/005* (2006.01)
(Continued)

(52) U.S. Cl.
CPC ........ *A61B 1/0011* (2013.01); *A61B 1/00066* (2013.01); *A61B 1/00091* (2013.01);
(Continued)

(58) Field of Classification Search
CPC ..... A61B 1/0008; A61B 1/00137; A61B 1/05; A61B 1/051; A61B 1/053; A61B 1/0676
(Continued)

(56) References Cited

U.S. PATENT DOCUMENTS 5,257,617 A * 11/1993 Takahashi .......... A61B 1/00142
600/128
5,419,311 A 5/1995 Yabe et al.
(Continued)

FOREIGN PATENT DOCUMENTS

DE 3004089 A1 8/1980
EP 0161834 B1 1/1988
(Continued)

OTHER PUBLICATIONS

Examination Report issued for EP Patent Application No. 20153967. 3, dated Jan. 24, 2024, 5 pages.
(Continued)

*Primary Examiner* — Michael J Carey
*Assistant Examiner* — Stephen Floyd London
(74) *Attorney, Agent, or Firm* — Faegre Drinker Biddle & Reath LLP

(57) ABSTRACT

A tip part (2) for forming a tip of a disposable insertion endoscope (1) the tip part comprising: •a camera insertion sleeve (28) provided within the interior spacing, the camera insertion sleeve being formed by a circumferential camera sleeve wall that extends from the distal front wall of the housing to a proximal end of the camera insertion sleeve so that the camera insertion sleeve comprises an open proximal end; •a tube insertion sleeve (38) provided within the interior spacing and fixed in relation to the distal front wall, the tube insertion sleeve being formed by a circumferential tube sleeve wall that extends a total tube sleeve length S from the distal front wall of the housing to a proximal end of the tube
(Continued)

insertion sleeve so that the tube insertion sleeve comprises an open proximal end; •the circumferential housing wall comprises at least one cut-out (41) extending from the proximal end towards the distal front wall, the at least one cut-out leaving space for constructive elements within the at least one cut-out, such constructive elements comprising e.g. fixation, such as crimps, of steering wires and/or alignment elements for alignment of the tip part during manufacture. Furthermore, methods of manufacture thereof are disclosed.

18 Claims, 11 Drawing Sheets

(51) Int. Cl.
| | |
|---|---|
| A61B 1/015 | (2006.01) |
| A61B 1/018 | (2006.01) |
| A61B 1/05 | (2006.01) |
| A61B 1/06 | (2006.01) |
| A61B 1/07 | (2006.01) |
| A61B 1/12 | (2006.01) |

(52) U.S. Cl.
CPC .......... *A61B 1/00096* (2013.01); *A61B 1/009* (2022.02); *A61B 1/015* (2013.01); *A61B 1/018* (2013.01); *A61B 1/051* (2013.01); *A61B 1/0661* (2013.01); *A61B 1/07* (2013.01); *A61B 1/126* (2013.01); *A61B 1/00097* (2022.02); *A61B 1/05* (2013.01)

(58) Field of Classification Search
USPC .......................................................... 600/129
See application file for complete search history.

(56) References Cited

U.S. PATENT DOCUMENTS

| | | | |
|---|---|---|---|
| 5,499,625 | A | 3/1996 | Frass et al. |
| 5,536,236 | A | 7/1996 | Yabe et al. |
| 5,562,602 | A | 10/1996 | Yabe et al. |
| 5,575,756 | A | 11/1996 | Karasawa et al. |
| 5,685,823 | A | 11/1997 | Ito et al. |
| 5,688,221 | A | 11/1997 | Yabe et al. |
| 5,725,476 | A | 3/1998 | Yasui et al. |
| 5,788,628 | A | 8/1998 | Matsuno et al. |
| 5,876,329 | A * | 3/1999 | Harhen ............... A61B 1/00142 600/125 |
| 6,248,060 | B1 | 6/2001 | Buess et al. |
| 6,409,657 | B1 | 6/2002 | Kawano |
| 6,447,445 | B1 | 9/2002 | Hirano |
| 6,569,089 | B1 | 5/2003 | Covington et al. |
| 8,485,966 | B2 | 7/2013 | Robertson |
| 10,245,402 | B2 | 4/2019 | Daher et al. |
| 10,321,804 | B2 | 6/2019 | Jacobsen et al. |
| 10,406,309 | B2 | 9/2019 | Daher |
| 11,291,352 | B2 | 4/2022 | Vilhelmsen et al. |
| 11,786,108 | B2 | 10/2023 | Sørensen et al. |
| 12,349,866 | B2 | 7/2025 | Sørensen et al. |
| 2005/0154262 | A1 | 7/2005 | Banik et al. |
| 2006/0173243 | A1* | 8/2006 | Watanabe ................ A61B 1/04 600/141 |
| 2007/0249907 | A1 | 10/2007 | Boulais et al. |
| 2008/0188715 | A1 | 8/2008 | Fujimoto |
| 2008/0200764 | A1 | 8/2008 | Okada |
| 2009/0227998 | A1 | 9/2009 | Aljuri et al. |
| 2009/0247831 | A1 | 10/2009 | Miyamoto et al. |
| 2009/0253964 | A1 | 10/2009 | Miyamoto |
| 2010/0298640 | A1* | 11/2010 | Oneda ................ A61B 1/00105 600/109 |
| 2011/0118549 | A1* | 5/2011 | Han ......................... A61B 1/04 29/854 |
| 2012/0041534 | A1 | 2/2012 | Clerc et al. |
| 2012/0172664 | A1 | 7/2012 | Hayman et al. |
| 2012/0259173 | A1 | 10/2012 | Waldron et al. |
| 2012/0316395 | A1 | 12/2012 | Koga |
| 2014/0150782 | A1 | 6/2014 | Vazales et al. |
| 2015/0223671 | A1 | 8/2015 | Sung et al. |
| 2015/0257633 | A1 | 9/2015 | Hassidov et al. |
| 2015/0272430 | A1* | 10/2015 | Oishi ................... A61B 1/0011 600/112 |
| 2016/0213229 | A1* | 7/2016 | Kitano ............... A61B 1/00112 |
| 2017/0245734 | A1 | 8/2017 | Kaneko |
| 2018/0055334 | A1* | 3/2018 | Ando ................. A61B 1/00112 |
| 2018/0078120 | A1 | 3/2018 | Poll et al. |
| 2018/0160886 | A1 | 6/2018 | Govani et al. |
| 2019/0133423 | A1* | 5/2019 | Birnkrant ................. A61B 1/04 |
| 2019/0175002 | A1* | 6/2019 | Igarashi ............. A61B 1/00094 |
| 2019/0282070 | A1 | 9/2019 | Vilhelmsen et al. |
| 2019/0282077 | A1 | 9/2019 | Sørensen et al. |
| 2019/0313891 | A1 | 10/2019 | Oka |
| 2020/0196434 | A1* | 6/2020 | Kuo ....................... H04N 23/57 |
| 2020/0297193 | A1* | 9/2020 | Takahashi .............. G02B 7/021 |
| 2021/0127953 | A1* | 5/2021 | Oyama ................ A61B 1/0676 |
| 2021/0228064 | A1 | 7/2021 | Sørensen et al. |
| 2021/0247604 | A1* | 8/2021 | Endo ................. G02B 23/2484 |
| 2021/0290041 | A1* | 9/2021 | Morita ................... A61B 1/051 |
| 2022/0183541 | A1 | 6/2022 | Sczaniecka |
| 2023/0068676 | A1 | 3/2023 | Sorensen et al. |
| 2023/0165438 | A1 | 6/2023 | Tang |
| 2023/0414072 | A1 | 12/2023 | Sørensen et al. |

FOREIGN PATENT DOCUMENTS

| | | |
|---|---|---|
| EP | 0497347 A2 | 8/1992 |
| EP | 0587177 A1 | 3/1994 |
| EP | 1759625 B1 | 10/2008 |
| EP | 2106739 A2 | 10/2009 |
| EP | 3539449 A1 | 9/2019 |
| JP | H08286127 A | 11/1996 |
| JP | H11188004 A | 7/1999 |
| JP | 5566344 B2 | 8/2014 |
| WO | 1994022358 A1 | 10/1994 |
| WO | 2010066790 A1 | 6/2010 |

OTHER PUBLICATIONS

Search Report issued by the European Patent Office, dated Aug. 7, 2020, for related Application No. EP20153967.3; 8 pages.
International Search Report and Written Opinion of International Application No. PCT/EP2020/083527, dated Jan. 19, 2021.
International Search Report and Written Opinion of International Application No. PCT/EP2020/083525, dated Apr. 1, 2021.
Examination report issued in European Patent Application No. 20 811 351.4, dated Mar. 26, 2025, 3 pages.
Examination report issued in European Patent Application No. 20 812 031.1, dated Apr. 15, 2025, 4 pages.
Office Action in related U.S. Appl. No. 17/794,699 (1167) dated Dec. 17, 2024, 38 pages.

* cited by examiner

TIP PART FOR FORMING A TIP OF A DISPOSABLE INSERTION ENDOSCOPE

CROSS-REFERENCE TO RELATED APPLICATIONS

This application is a National Stage entry filed under 35 U.S.C. § 371 of International Application No. PCT/EP2020/083525, filed Nov. 26, 2020, which claims priority from and the benefit of European Patent Application No. EP20153967.3, filed Jan. 28, 2020; the contents of the aforementioned applications are incorporated herein by reference in their entirety.

TECHNICAL FIELD

The present disclosure relates to insertable medical vision devices, such as, but not limited to, endotracheal tubes and endoscopes, in particular disposable insertion endoscopes, more specifically to a tip part of such a vision device, to an endoscope with such a tip part, and to a method of manufacture of such a tip part.

BACKGROUND ART

Vision devices, such as endoscopes, are well known for visually inspecting inaccessible places such as human body cavities. Typically, the endoscope comprises an elongated insertion tube with a handle at the proximal end, as seen from the operator, and visual inspection means, such as a built-in camera including a vision sensor, at a distal end of the elongated insertion tube. This definition of the terms distal and proximal, i.e. "proximal" being the end closest to the operator and "distal" being the end remote from the operator, as used herein for endoscopes in general, is adhered to in the present specification. Electrical wiring for the camera and other electronics, such as one or more LEDs accommodated in the tip part at the distal end, runs along the inside of the elongated insertion tube from the handle of the endoscope to the tip part. A working or suction channel may run along the inside of the insertion tube from the handle to the tip part, e.g. allowing liquid to be removed from the body cavity or allowing for insertion of surgical instruments or the like into the body cavity. The suction channel may be connected to a suction connector, typically positioned at a handle at the proximal end of the insertion tube.

To be able to manoeuvre the endoscope inside the body cavity, the distal end of the endoscope may comprise a bending section with increased flexibility, e.g. a number of articulated segments of which the tip part or an external housing thereof may form the distalmost segment. The manoeuvring of the endoscope inside the body is typically done by tensioning or slacking pull wires also running along the inside of the elongated insertion tube from the tip part through the remainder of articulated segments to a control mechanism of the handle.

As the name indicates, endoscopes are used for seeing inside things, such as lungs or other human body cavities of a patient. Modern endoscopes are therefore typically equipped with a light source and a camera or vision receptor including a vision or image sensor. Provided that sufficient light is present, it is possible for the operator to see where the endoscope is steered and to set the target of interest once the tip has been advanced thereto. This therefore normally requires illumination of the area in front of the distal tip of the endoscope, in particular the field of vision of the camera(s). The light source, such as a light emitting diode or an optical fiber, may provide illumination.

Additionally, when, as in the present disclosure, the insertion tube of the endoscope is intended to be inserted into a human body cavity, the insertion tube should furthermore be sealed in a watertight manner. This is particularly the case for a distal tip part accommodating a camera, LED(s), and/or other delicate electronics, prone to malfunction or destruction if exposed to humidity.

One known way of sealing the tip part of an endoscope is disclosed in WO2010/066790. In this document, a transparent monolithic housing is formed around the electronics and working channel by placing the electronics and the tube forming the working channel in a mold of transparent material, such as silicone. A transparent UV curable resin is then inserted from the bottom of the mold to avoid bubbles to form in the transparent resin. Because the resin rises slowly from the bottom, the air is slowly expelled from top of the mold, without any risk of air bubbles being trapped in the mold. The resin is then cured using UV irradiation through the transparent mold to form the monolithic housing.

DISCLOSURE OF INVENTION

A first aspect of this disclosure relates to a tip part for forming a tip of a disposable insertion endoscope, the tip part comprising:
  an exterior housing having an open proximal end for connection to other parts of the endoscope, the housing further having a distal front wall and a circumferential housing wall, the circumferential housing wall extending from the distal front wall to the proximal end of the housing, the distal front wall and the circumferential housing wall enclosing an interior spacing of the tip part;
  a camera window positioned in or forming part of the exterior housing;
  a camera insertion sleeve provided within the interior spacing, the camera insertion sleeve being formed by a circumferential camera sleeve wall that extends from a distal end of the housing to a proximal end of the camera insertion sleeve so that the camera insertion sleeve comprises an open proximal end; and
  a camera assembly able to provide an image from light received from an object to be investigated;
  wherein the camera assembly is inserted into the camera insertion sleeve so that light received from an object to be investigated can pass through the camera window to the camera assembly.

The tip parts according to this disclosure may make it possible to reduce external dimensions of the tip parts and may reduce costs and time in manufacture.

The tip of the disposable insertion endoscope may be a distal tip of the disposable insertion endoscope.

The tip part may further be attached to and/or comprise a bending section having a distal end segment, the distal end of the bending section and the proximal open end of the housing potentially being adjoined to each other.

The exterior housing may comprise a first material, which may be a first polymer material. The exterior housing may be an outer most wall of the tip part. The exterior housing may be cup-shaped, the cup being formed by the distal front wall and the circumferential housing wall. The exterior housing may fluid seal the interior spacing. The first material may be a fluid tight material.

The circumferential housing wall may have a cylindrical or circular-cylindrical outer and/or inner surface. The circumferential housing wall may comprise or be a circumferentially extending cylindrical wall.

The circumferential housing wall may extend in a direction distally-to-proximally. The distal front wall may extend in a transverse direction, the transverse direction being transverse to the distally-to-proximally direction.

The distal front wall may be positioned oppositely from the proximal end of the housing. The distal front wall may be at least partly coinciding with a distal end of the tip part.

The circumferential camera sleeve wall may extend from the camera window to the proximal end of the camera insertion sleeve. The circumferential camera sleeve wall and/or the camera insertion sleeve may comprise the first material which may be the first polymer material. The circumferential camera sleeve wall and/or the camera insertion sleeve may comprise the same material as the exterior housing.

The camera insertion sleeve may be positioned between proximal and distal ends of the interior spacing and/or circumferential housing wall. The circumferential camera sleeve wall may extend from the distal front wall of the housing to the proximal end of the housing. The proximal end of the camera insertion sleeve may extend to the proximal end of the housing.

The circumferential camera sleeve wall may be at least partly formed by and/or partly coinciding with the circumferential housing wall. Alternatively, the circumferential camera sleeve wall may be formed separately of the circumferential housing wall i.e. not integrally or in one piece with the circumferential housing wall. The circumferential camera sleeve wall may be a wall that is separate of the circumferential housing wall.

The camera insertion sleeve may comprise a lens stack holder in which the lens stack is inserted. The lens stack may be inserted into the lens stack holder when the camera assembly is inserted into the camera insertion sleeve. The lens stack holder may have a shape that is complementary to a shape of the lens stack. The lens stack holder may be positioned at a distal end of the camera insertion sleeve. The lens stack holder may be a depression in the distal front wall and/or the camera window. The lens stack holder may be positioned centrally in a cross-section of the camera insertion sleeve. The lens stack holder may be positioned between two light guides. The lens stack holder may extend in to the distal front wall and/or camera window. The two light guides may extend in the proximal-distal direction along opposite sides of the lens stack holder. The lens stack holder may be positioned at a distal end of the camera insertion sleeve. The lens stack holder may extend into the distal front wall and/or the camera window. A part of the lens stack holder may be formed in the distal front wall and/or the camera window. The lens stack holder may be at least partly formed in the distal front wall and/or camera window. The lens stack holder may be provided within the circumferential camera sleeve wall.

In the context of the present disclosure, a sleeve is any component which allows insertion of another component into it.

The camera insertion sleeve may comprise opposing vertical surfaces. The opposing vertical surfaces may be positioned at sides of the camera assembly when the camera assembly is inserted into the camera insertion sleeve. The opposing vertical sides may be provided at the lateral sides of the camera insertion sleeve and/or camera assembly when the camera assembly is inserted. The opposing vertical surfaces may extend from respective light guides, potentially next to one or more light sources of the camera assembly if inserted, to the proximal end of the camera insertion sleeve. The opposing vertical surfaces may be interconnected by one or more inclined surfaces extending between the opposing vertical surfaces. The opposing vertical surfaces may constitute sides, potentially lateral sides, of the camera insertion sleeve. The opposing vertical sides may be interconnected at a top side and/or a bottom side of the camera insertion sleeve by one or more inclined surfaces. The inclined surfaces may be inclined relative to the opposing vertical sides of the camera insertion sleeve. When looking in the proximal-distal direction at a cross-section of the camera insertion sleeve taken transversely to the proximal-distal direction, the cross-section of the camera insertion sleeve may have two opposed vertical surfaces and/or sides, potentially defining lateral sides of the camera insertion sleeve. The opposing vertical surfaces may be interconnected by a top side and a bottom side of the camera insertion sleeve. The top side and/or bottom side may comprise one or more inclined surfaces. A largest extent between the two opposing vertical sides may be larger than a largest extent between the top side and bottom side of the camera insertion sleeve. The camera assembly may comprise one or more surfaces that are complementary to one or more surfaces of the camera insertion sleeve.

The camera insertion sleeve may comprise one or more guide surfaces for guiding the camera assembly during insertion into the camera insertion sleeve. The guide surfaces may be in the form of guide elements as disclosed herein.

When the camera assembly is inserted into the camera insertion sleeve, there may be a spacing between the printed circuit board and the camera insertion sleeve. The spacing may extend between a majority of the camera assembly and the camera insertion sleeve. The guide surfaces and/or guide elements may space apart the camera assembly and the camera insertion sleeve.

The camera assembly may be slid out of camera insertion sleeve potentially after removing an adhesive and/or sealant provided at the proximal end of the camera assembly and/or between the camera assembly and the camera insertion sleeve.

The camera insertion sleeve may comprise and/or be formed of the same material as the exterior housing.

Additionally or alternatively, the lens stack may comprise a casing potentially in the form of a lens barrel, positioned between a first light source and a vision sensor of the camera assembly, the casing potentially including a light shield configured to substantially prevent light from passing through the casing. The light shield may be provided in the form of a light shielding layer provided on the casing. The light shielding layer may be provided by an adhesive, potentially hardened glue. The glue may be opaque, potentially black. The light shielding layer may be provided around the lens stack holder. The camera window may be a transparent part in or of the exterior housing enabling light to enter into the tip part to be received by the image sensor. The camera window may be formed integrally and in one piece with the circumferential camera sleeve wall.

The camera window may comprise a second material, which may be a second polymer material, and which may be different from said first polymer material of the exterior housing. The second material may be a fluid tight material. The camera window and the exterior housing may be integrally molded in one piece by a multi-component molding process. A front surface of the camera window may be in the same plane as a front surface of the exterior housing.

The first polymer material may include or consist of one or several polymers and/or further materials. One or more of said polymers may be plastic or thermoplastic polymers. Said first polymer material and a potential second polymer material (see below) may be selected from thermoplastic materials, thermoset materials, and elastomers. The second material may comprise or consist of a transparent material and/or may include or consist of several polymers and/or further materials. Said first polymer material and/or said second polymer material may be fiber-reinforced. The first material may be opaque at least in a set condition. Said first polymer material may also be selected for other properties, such as good adhesion to sealant materials and adhesives. Thus, the set said first polymer material may have better adhesion properties to glue than the second polymer material.

A first window part and a second window part of the camera window may be molded as one single piece of a second polymer material.

The first material may be opaque. This may allow the introduction of shading parts inter alia reducing stray light and glare into the vision receptor.

The first material may have better adhesion properties to glue than the second material. This may allow the circumferential housing wall to adhere efficiently to a sealing glue for sealing the interior spacing, and for an exterior sleeve or an outer sheath of the insertion tube of the endoscope to be securely adhered to the exterior or the interior of the circumferential housing wall.

The second material may be a thermoplastic material. This may allow the exterior housing to be produced in an efficient manner, such as by injection molding.

The vision sensor may be a camera sensor of a camera which may form part of the camera assembly.

In a development of the previous embodiment, the circumferential housing wall extends a total distance H from the distal front wall of the housing to the proximal end of the housing, and the circumferential camera sleeve wall extends a total distance X from the distal front wall of the housing to the proximal end of the camera insertion sleeve, wherein the distance X is at least half the distance H.

The distance X may be at least 6/10, 7/10, 8/10, 9/10, 10/10, 11/10, 12/10, 13/10, 14/10, 15/10, 16/10 of distance H. Distance X may be equal to distance H. Distance X and/or the circumferential camera sleeve wall may extend parallel with distance H and/or the circumferential housing wall.

The camera insertion sleeve may be wider than it is tall. The camera insertion sleeve may have a total width that is larger than a total height. The total width may be a dimension extending transversely to the proximal-distal direction. The total width may extend between the opposing vertical surfaces. The total height may extend orthogonally to the width, potentially between a top surface and a bottom surface of the camera insertion sleeve. The total width may be at least 1.1, 1.2. 1.3, 1.4, 1.5, 1.6, 1.7, 1.8, 1.9, 2, 2.1, 2.2, 2.3, 2.4, 2.5, 2.6, 2.7, 2.8, 2.9, 3.1, 3.2, 3.3, 3.4, 3.5, 3.6, 3.7, 3.8, 3.9, 4, 4.1 or more times larger than the total height of the camera insertion sleeve. The width and height may extend transversely to the proximal-distal direction in a cross-section of the camera insertion sleeve. The height may be in a radial direction. A cross-section of the camera insertion sleeve taken transversely of the proximal-distal direction may have a total first length in a first dimension, potentially a width dimension, and a total second length in a second dimension, potentially a height dimension, which is orthogonal to the first dimension. The total first length may be a total width of the camera insertion sleeve. The total second length may be the total height of the camera insertion sleeve. The total first length may be larger than the total second length.

The interior surface of the camera insertion sleeve may comprise several opposing sides and/or sub surfaces. The light guides may be positioned at lateral sides of the camera insertion sleeve and/or lens stack holder.

A cross-section may be a lateral cross-section extending transversely to the proximal-distal direction and/or the circumferential housing wall. A lateral cross-sectional shape of the camera insertion sleeve may be oblong, elliptical, rectangular, bean-shaped, sausage-shaped, or the like. The lateral cross-sectional shape may comprise a depression potentially near its middle and/or above the lens stack holder when looking from the proximal-distal direction. The depression may extend from the distal end to the proximal end of the camera insertion sleeve The camera window may be positioned distally of the lens stack holder. The camera window may be positioned distally of a depression in the distal front wall. The camera window may be positioned in a depression in the distal front wall. A part of the depression may be provided between two light guides.

The camera insertion sleeve may be positioned at a top of the interior spacing. A working channel fluid opening and/or working channel tube may be positioned below the camera insertion sleeve.

A total length of the exterior housing and/or circumferential housing wall may be less than a largest cross-sectional extent of the exterior housing and/or circumferential housing wall and/or distal front wall. A cross-section may extend transversely to the length of a given component. A cross-section may extend transversely to the proximal-distal direction. The total length of the exterior housing and/or the circumferential housing wall may be equal to or more than 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4 times the largest cross-sectional extent of the exterior housing and/or the circumferential housing wall and/or the distal front wall. The largest cross-sectional extent of the exterior housing and/or the circumferential housing wall and/or the distal front wall may be the diameter thereof.

In an embodiment, the camera window is positioned in or forms part of the distal front wall.

In an embodiment, the circumferential camera sleeve wall extends from the distal front wall of the housing to the proximal end of the camera insertion sleeve.

In an embodiment, the camera assembly comprises a vision sensor, a lens stack, and a printed circuit board (PCB), and wherein the vision sensor, the lens stack, and at least part of the printed circuit board are positioned within the camera insertion sleeve.

In an embodiment, the camera insertion sleeve is fluid tight and/or fluid sealed from a surrounding portion of the interior spacing.

The camera insertion sleeve may be fluid tight and/or fluid sealed against the distal front wall and/or the camera window.

In an embodiment, the camera insertion sleeve is formed integrally and in one piece with the distal front wall and/or with the camera window and/or with the circumferential housing wall.

The camera insertion sleeve, the distal front wall, and the circumferential housing wall may all be formed integrally and in one piece with each other.

The term "integrally formed in one piece" as used herein may involve that two or more parts are integrally molded in one piece with each other, potentially in a multi-component molding process as disclosed herein.

The circumferential housing wall may be a side wall and/or may have a substantially cylindrical shape. The distal front wall and camera window may be integrally formed or molded in one piece. The distal front wall and the circumferential housing wall may form a liquid-tight (except for any potential inlets, outlets, and openings) barrier or border between an exterior of the tip part or the environment and the interior spacing of the tip part. The exterior housing may also accommodate at least part of a working channel for supplying fluid to a working channel opening in the distal front wall.

By integrally forming the circumferential housing wall and distal front wall, a sealed tip part may be provided. Additionally, assembly of the tip part may be made simpler as fewer parts are required. Similarly by integrally forming the circumferential camera sleeve wall and the distal front wall and/or camera window, a sealed camera sleeve may be provided.

Additionally or alternatively, the exterior housing may essentially consist of the same material as the window, such as a transparent material.

This may provide the advantage that the first and second materials can be selected according to the desired properties, for instance a transparent material may be selected for the window and an opaque material may be selected for the exterior housing.

In this context and applying generally to this disclosure, the term "comprises" includes "consists essentially of".

The multi-component molding process may be a two-component molding process.

In an embodiment, an entirety of the printed circuit board is positioned within the camera insertion sleeve.

An entirety of the printed circuit board may be positioned between the proximal end and the distal end of the camera insertion sleeve. There may be a distance of more than zero extending in the proximal-distal direction from the proximal end of the camera insertion sleeve to a proximal end of the printed circuit board. The printed circuit board may also comprise light sources such as LEDs. The printed circuit board may be attached to the vision sensor. The printed circuit board may extend from a proximal end of the vision sensor to a proximal end of the printed circuit board.

An adhesive and/or sealant may be provided at a proximal end of the printed circuit board of the inserted camera assembly whereby the printed circuit board may be fluid sealed in the camera insertion sleeve.

In development of the previous embodiment, the camera assembly is sealed against the camera insertion sleeve by an adhesive and/or sealant.

The adhesive and/or sealant may be provided at the proximal end of the camera sleeve wall between the camera assembly and the camera sleeve wall. The adhesive and/or sealant may be provided between the camera assembly and the circumferential camera sleeve wall and/or, if a guide casing is present, between the guide casing and the circumferential camera sleeve wall. The adhesive and/or sealant may be provided between an exterior surface of a proximal end of the camera assembly and/or guide casing if present, and an interior surface of the circumferential camera sleeve wall. The adhesive and/or sealant may be provided between an interior surface of the proximal end of the circumferential camera sleeve wall and an exterior surface of the camera assembly and/or guide casing if present.

In an embodiment, the camera assembly comprises one or more light sources for providing light to the object to be investigated.

In a development of the previous embodiment, the camera assembly is inserted into the camera insertion sleeve so that the one or more light sources are also positioned within the camera insertion sleeve.

One or more light source may be positioned on each side of the lens stack.

The tip part may further comprise one or more light guides positioned in front of each of the one or more light sources.

Additionally or alternatively, the camera insertion sleeve and/or the camera window and/or distal front wall may comprise one or more light guides positioned in front of the one or more light sources, potentially directly in front of the one or more light sources, when the camera assembly is inserted into the camera insertion sleeve. A light guide may be positioned on each side of the camera assembly when the camera assembly is inserted in the camera insertion sleeve.

Additionally or alternatively, the one or more light guides may be of a transparent material, potentially the same material as the camera window. The one or more light guides may have a predetermined length between at least one first light reception end adapted for receiving light from a respective light source and at least one second light emission end adapted to emit light. The one or more light guides may form an integral part of the camera insertion sleeve and/or the exterior housing and/or the camera window. By integrating the one or more light guides in the camera insertion sleeve and/or the exterior housing and/or the camera window, it becomes possible to provide a sealed front end of the tip part and at the same time provide a well-defined exit viewing angle for the light from a respective light source.

The one or more light sources may be positioned within the camera insertion sleeve to abut a light guide when the camera assembly is inserted into the camera insertion sleeve.

The camera window may also extend to be positioned in front of the one or more light sources, or a window part may include the camera window and one or more light windows as described further below. Alternatively, a light window provided separately from the camera window may be provided for the one or more light sources, the separate light window being provided in front of the one or more light sources, potentially in a distal front surface of the tip part.

The exterior housing may comprise a first window part arranged in front of the vision sensor in the field of view thereof and a second window part arranged in front of one or more light sources.

The exterior housing may comprise a first polymer material and a second polymer material, the second polymer material being transparent.

The lens stack may comprise one or more lenses and may be arranged between the vision sensor and the camera window, potentially within the camera insertion sleeve. The one or more lenses may be arranged, potentially in a lens stack, in front of the vision sensor, potentially so that an optical axis of the lens, potentially of the one or more lenses, align or coincide with an optical axis of the vision sensor. A front or distal lens may form the camera window. The plurality of lenses may be spaced apart by at least one spacer, potentially a plurality of spacers. The camera assembly may comprise a printed circuit board (PCB) having at least one electrical component for converting light received by the camera assembly to an image. The camera window may have different shapes, such as circular, half-moon shaped etc. The camera window may comprise a plurality of window parts. The window parts may abut each other. The window parts may be fixed to each other, potentially by gluing or welding. The camera window may form part of the exterior housing. The camera window may be integrally formed or molded in one piece with the exterior housing. The camera window may be formed by a lens, potentially a front lens of a lens stack, of the camera assembly in which case this lens may be positioned in an opening of the housing.

The camera assembly may comprise a vision sensor, and/or a lens stack, and/or a printed circuit board (PCB).

Additionally or alternatively, the camera window may be a distal front window, potentially allowing the vision sensor to receive image information from the distal end of the tip part. An exterior surface of the camera window may form part of a distal front wall of the exterior housing.

Additionally or alternatively, the camera window may be a side window, for instance when the endoscope is a duodenum endoscope. In this case, the distal front wall may be a side distal front wall positioned at a lateral side surface of the tip part. The side window may allow the vision sensor to receive image information from a side, potentially from a radial direction, of the tip part. The exterior surface of the window may be an exterior side surface. Accordingly, the distal front wall may be a side distal front wall instead of a distal front wall.

Additionally or alternatively, the camera window may comprise a front window and a side window. Accordingly, the distal front wall may be both a distal and a side distal front wall.

The camera window may comprise, potentially consist essentially of, a transparent material. A transparent material can transmit some image information and may potentially be defined as allowing at least 50% of visible light entering the window at the exterior surface to pass through the window. The transparent material may be a polymer, glass, plastic polymer, or any other suitable material, e.g. silicone, or a combination thereof.

The tip part may further comprise a window part positioned at or in the distal front wall, wherein the window part comprises the camera window, and the window part is formed of a second polymer material, the second polymer material being different from said first polymer material.

The second polymer material being different from said first polymer material may involve that a composition of the two polymer materials is different and/or that the first polymer material comprises at least one component not included in the second polymer material, or reversely. For example, the first polymer material may comprise a polymer not included in the second polymer material, and/or reversely, and/or the first polymer material may comprise a specific polymer in one amount and the second polymer material comprises the same specific polymer in a different amount. Various physical or chemical properties, such as melting point and/or adhesive properties may similarly be different in the two polymer materials.

Alternatively, the window part is formed of the same material as the exterior housing, i.e. of the said first polymer material, which may in this case be transparent and/or translucent.

The window part may form part of the exterior housing or may be provided separately from the exterior housing.

The exterior housing may have been or may be manufactured in a two-component molding process, whereby the window part or camera window can potentially be said to be integrally molded in one piece with the distal front wall, the circumferential housing wall, and the camera insertion sleeve.

The window part may be positioned in a cut-out of the distal end wall and/or may extend into a cut-out of the circumferential housing wall.

The window part may further include one or more, such as two, light windows for distribution of light from light sources positioned within the spacing of the exterior housing. The camera window and the light window(s) may be integrally formed in one piece with each other, the light window(s) potentially being integrally molded in one piece with the camera window.

The window part and/or the camera window may be transparent and/or translucent. The light window(s) may similarly be transparent and/or translucent and/or may allow light from an object to be investigated to pass through the light window(s) to illuminate the object to be investigated. The object to be investigated will typically be provided in front of or distal to the distal front wall, the camera window, and the light window(s).

The camera window may generally be positioned with a center line of the camera window coinciding with a center line of a distal front surface of the tip part or of the exterior housing. Two light windows may be positioned one on each side of the camera window, potentially with an equal distance to the center lines.

The one or more light guides may each be positioned behind or proximally from a light window. The window part may comprise the light guide(s). The light guide(s) may thus be formed of the second polymer material.

Alternatively, the light guide is provided separately from the window part and/or of the same material as the exterior housing, i.e. of the first polymer material, which may in this case be transparent.

The light guide(s) may form part of the exterior housing or may be provided separately from the exterior housing.

The exterior housing may have been or may be manufactured in a two-component molding process, whereby the window part including the light guide(s) can potentially be said to be integrally molded in one piece with the distal front wall, the circumferential housing wall, and the camera insertion sleeve.

The light window may be a distal end of the light guide.

The light guide(s) may extend in a proximal direction into the interior spacing of the exterior housing.

The camera window and/or the light window(s) and/or the light guide(s) may be integrally formed in one piece with each other, these parts potentially being integrally molded in one piece. The light guide(s) may be transparent.

In this specification, the term "to accommodate" may additionally or alternatively be defined as "to house" or "to enclose" or "to surround". For instance, the exterior housing may enclose or surround the vision sensor and/or the one or more light sources.

In this specification, the terms "integrally" or "integrally provided" or "integrally comprising" or similar may be defined as the associated features forming an integral part of a whole; and/or are in one piece, potentially molded in one piece; and/or are substantially inseparable by hand.

In this specification, the term "proximal" may be defined as being closest to an operator of the endoscope, and the term "distal" as being remote from the operator. The term "proximal-distal" may be defined as extending between these two extremes, in the present case proximal-distal may extend along a center axis of the tip part extending between a proximal extremity of the proximal end of the tip part and a distal extremity of the distal end of the tip part.

In this specification, the distal end of the tip part should not be construed to only comprise the most distal extremity of the tip part, rather the term "distal end of the tip part" should be understood as a portion of the tip part being distally positioned, e.g. a remaining portion of the tip part relative to the proximal or back end and/or a portion of the tip part for not being connected to other parts of the endoscope and/or a distally located half of the tip part. In some embodiments, the camera window may be a side window positioned at the distal or front end of the tip part.

In this specification, the term "interior" may be defined as being positioned in an interior space of the tip part, and the term "exterior" may be defined as being positioned in an exterior space of the tip part or as not being positioned in an interior space of the tip part. The exterior housing may include an exterior surface that forms an outer surface of the exterior housing or the tip part.

In this specification, an endoscope may be defined as a device adapted for viewing body cavities and/or channels of a human and/or animal body. The endoscope may for instance be a conventional flexible or steerable endoscope or a rigid endoscope or an endotracheal tube potentially provided with a camera and light source for ensuring the correct position of the endotracheal tube, for instance a laryngoscope. The endoscope may be a duodenum endoscope or a urethroscope, or, in particular, a gastroscope or a colonoscope.

The tip part may additionally or alternatively comprise a working channel tube which potentially forms part of a working channel of an endoscope. The exterior housing may accommodate at least part of the working channel tube. The working channel tube may be sealed in relation to the exterior housing, potentially so that fluid in the working channel tube may not ingress into the interior of the exterior housing. The working channel tube may include a fluid opening potentially in the form of a working channel fluid opening, which may be positioned in a distal front surface of the exterior housing.

In an embodiment, the camera assembly further comprises a guide casing for guiding the camera assembly in the camera insertion sleeve.

The guide casing may comprise an exterior shape that is complementary to an interior shape of the camera insertion sleeve. The guide casing may be a bushing for inserting into the camera insertion sleeve. The guide casing and/or bushing may be attached to the camera assembly before or after insertion of camera assembly into camera insertion sleeve. The guide casing may be attached by adhesion such as by an adhesive or by molding the guide casing to the other components of the camera assembly.

The guide casing may include a light shield configured to substantially prevent light from passing through the casing.

The guide casing may at least partly encase the camera assembly including the vision sensor and/or lens stack and/or one or more light sources, and/or printed circuit board. The guide casing may extend in a proximal-distal axis of the camera assembly. The guide casing may extend along the proximal-distal direction of the tip part when inserted in the camera insertion sleeve. The guide casing may be in the form of a shell potentially substantially having the shape of a cylindrical shell. The guide casing may comprise an interior shape that is complementary to an exterior shape of the camera assembly. The light shield may be provided in the form of a light shielding layer provided on the guide casing.

The light shielding layer may be provided by an adhesive, potentially hardened glue. The glue may be opaque, potentially black.

There camera insertion sleeve and/or guide casing may comprise one more guide elements for guiding the camera assembly and/or the guide casing during insertion and/or when inserted into the camera insertion sleeve. The one or more guide elements may guide the camera assembly and/or guide casing by physically contacting the camera insertion sleeve and/or camera assembly and/or guide casing and/or by delimiting the spacing within the camera insertion sleeve to position the camera assembly and/or the guide casing. The guide elements may guide the camera assembly into a desired position in the camera insertion sleeve and/or distal front wall. The one or more guide elements may extend a total length in the proximal-distal direction equal to or less than ½, ⅓, ¼, ⅕, or 1/10 of a total length the guide casing extends in the proximal-distal direction when inserted. The guide elements may be the only physical contact between the camera insertion sleeve and the guide casing when the camera assembly is inserted into the camera insertion sleeve. The guide elements may be positioned on an interior surface of the camera insertion sleeve and/or on an exterior of the guide casing. The guide elements may protrude from the interior surface of the camera insertion sleeve and/or the exterior of the guide casing.

In a development of the previous embodiment, the guide casing comprises an exterior shape that is complementary to an interior shape of the camera insertion sleeve.

In an embodiment, an interior surface of the camera insertion sleeve comprises one or more guide elements for guiding the camera assembly during insertion.

In a development of the previous embodiment, the one or more guide elements protrude from the interior surface of the camera insertion sleeve.

In a development of either of the two previous embodiments, the camera insertion sleeve comprises a first pair of opposing guide elements, the pair of guide elements being positioned on opposing sides of the interior surface such that they face each other.

The camera insertion sleeve may comprise a second pair of opposing guide elements. The second pair of opposing guide elements may be positioned orthogonally to the first pair of guide elements. The first pair of guide elements may be positioned on opposing sides of the interior surface of the camera insertion sleeve, potentially on the opposing vertical surfaces. The second pair of opposing guide elements may be positioned at a top and a bottom of the camera insertion sleeve for guiding a top and a bottom of the camera assembly. The first pair of opposing guide elements may be positioned at lateral sides of the camera insertion sleeve for guiding lateral sides of the camera assembly. This may add to the accuracy of positioning of the camera assembly within the camera insertion sleeve.

The guide elements of the camera insertion sleeve and/or the guide casing may be formed integrally and in one piece with the camera insertion sleeve and/or guide casing respectively. The guide elements may be molded integrally and in one piece with the camera insertion sleeve and/or guide casing respectively.

In an embodiment, an exterior surface of the guide casing comprises one or more guide elements for guiding the camera assembly during insertion into the camera insertion sleeve.

In a development of the previous embodiment, the one or more guide elements protrude from an exterior surface of the guide casing.

The guide casing may comprise a first pair of guide elements positioned on opposite sides of the exterior surface of the guide casing and facing away from each other. The first pair of guide elements may be positioned on opposite lateral sides of the guide casing. The first pair of guide elements of the guide casing may align with and/or abut the first pair of guide elements of the camera insertion sleeve when the camera assembly is inserted.

Additionally or alternatively, the guide casing may comprise one or more guide elements positioned orthogonally to the first pair of guide elements potentially on a top and/or bottom surface of the guide casing.

The guide elements may be the only point of contact between the camera assembly and/or guide casing with the camera insertion sleeve. The guide elements may be positioned at the proximal end of the guide casing and/or camera insertion sleeve.

A proximal end of the guide casing may comprise a cable shield, for shielding and protecting the one or more cables extending from the proximal end of the camera assembly and potentially out of the proximal end of the camera insertion sleeve. The cable shield may completely enclose the one or more cables extending from the proximal end of the camera assembly and out of the proximal end of the camera insertion sleeve. The cable shield may comprise and/or provide an attachment surface for a cable sheath. A cable sheath may be attached to and sealed against the cable shield whereby the cables may be sealed fluid tight within the cable sheath. An adhesive and/or sealant may be provided between the cable sheath and the cable shield. The cable sheath may comprise or substantially consist of a fluid tight material. The cable sheath may extend from the cable shield to a proximal end of the endoscope.

In an embodiment, the camera assembly further comprise a sealing geometry such as a sealing surface, lip, and/or groove for sealing against the camera insertion sleeve.

The camera assembly and/or the guide casing and/or the cable shield, may further comprise a sealing geometry such as a sealing surface, lip, and/or groove for sealing against the camera insertion sleeve. The sealing geometry may be positioned at a proximal end of the camera assembly and/or the guide casing and/or the cable shield. The sealing geometry may seal against the interior surface of the camera insertion sleeve. An adhesive and/or sealant may be provided between the sealing geometry and/or guide casing and the interior surface of the camera insertion sleeve, whereby the camera assembly may be fluid sealed in the camera insertion sleeve. The sealing geometry may be positioned at the proximal end of the camera insertion sleeve when the camera assembly is inserted.

The guide casing may be substantially U-shaped. The guide casing may have two legs which are interconnected by an interconnecting part. The interconnecting part may substantially comprise and/or consist of the cable shield. The interconnecting part and the two legs may be formed integrally and in one piece. The interconnecting part and the two legs may be molded integrally and in on piece. The guide casing may comprise and or consist of the first and/or second material. The two legs of the guide casing may extend on opposite sides of the camera assembly. A distal end of each of the two legs may abut a light source of the camera assembly. The two legs may extend from a proximal end of the camera assembly along the printed circuit board and/or vision sensor and/or light sources and/or lens stack. The two legs may extend substantially in parallel. The two legs may be substantially rectangular. The guide casing may have a substantially box-shaped cross-section. The guide casing may constitute an exterior surface of the camera assembly. The two legs may comprise a top side, lateral side, and a bottom side respectively. An exterior surface of the respective lateral side of the two legs may face in away from each other. The lateral sides of the two legs may comprise one or more guide elements. The interconnecting part and/or the two legs may comprise one or more guide elements. The guide elements of the guide casing may be formed integrally and in one piece with the guide casing. The guide elements of the guide casing may be molded integrally and in one piece with the guide casing.

The first pair of guide elements of the guide casing may be positioned on opposite sides of the exterior surface of the guide casing, potentially on the two legs, and face away from each other. The first pair of guide elements of the guide casing may be positioned on an exterior surface of a respective lateral side of each of the two legs.

A lateral cross-section of the guide casing may have a complementary shape to the lateral cross-section of the camera insertion sleeve. The guide casing may comprise a depression complementing the depression of the camera insertion sleeve. The interconnecting part of the guide casing may comprise the depression.

In an embodiment, the tip part further comprises one or more tube insertion sleeves for receiving one or more tubes such as a working channel tube, fluid tubes, or the like.

The one or more tube insertion sleeves may be formed integrally in one piece with the distal front wall and/or exterior housing.

A tube, which may alternatively be denoted a pipe, may be positioned in each of the one or more tube insertion sleeves. Each tube may extend through the tip part, potentially to respective fluid sources. Each tube may be provided separately from or not in one piece with the exterior housing. A first of the tubes may be for gas, a second of the tubes may be for liquid.

Positioning of tubes in the tube insertion sleeves may occur subsequent to manufacture of the exterior housing including tube insertion sleeve and potentially the camera window and/or the camera insertion sleeve. The one or more tubes may be inserted into the tube insertion sleeves in a proximal to distal direction, potentially through a proximally positioned opening of the exterior housing.

An outer diameter or largest outer cross section of an outer surface of each tube may correspond to the diameter or largest cross section of each corresponding tube insertion sleeve.

The one or more tubes may have a constant diameter along its/their length(s). The one or more tubes may be flexible and may comprise or consist of a plastic or polymer material, such as PET, PE, or PP. The one or more tubes may be tubular and may be cylindrical.

At least a part of two tube insertion sleeves extending side-by-side may include an open slot extending longitudinally between them.

The open slot may avow for the two tubes to be positioned dose to, potentially abutting, each other along a longitudinal direction when the tubes are positioned in the tube insertion sleeves.

Potentially, parts of the tube insertion sleeves along a longitudinal direction may be coinciding and/or parts of circumferential tube sleeve walls may be removed from the cut-outs where the tube insertion sleeves intersect each other.

The tip part may comprise a nozzle. The nozzle may be positioned at or in the distal front wall. The nozzle may be integrally formed and in one piece with the distal front wall.

The nozzle may generally be suitable for ejection of both gas and liquid. The nozzle outlet may generally be for ejection of both gas and liquid. The nozzle may be an outlet for one or more of the tube insertion sleeves and/or tubes.

A second aspect the present disclosure relates to a method of manufacture of a tip part, the tip part being for forming a tip of a disposable insertion endoscope, the method comprising:

providing an exterior housing of the tip part having an open proximal end for connection to other parts of the endoscope, the housing further having a distal front wall and a circumferential housing wall, the circumferential housing wall extending from the distal front wall to the proximal end of the housing, the distal front wall and the circumferential housing wall enclosing an interior spacing of the tip part;

providing a camera window of the tip part positioned in or forming part of the exterior housing;

providing a camera insertion sleeve of the tip part within the interior spacing, the camera insertion sleeve being formed by a circumferential camera sleeve wall that extends from a distal end of the housing to a proximal end of the camera insertion sleeve so that the camera insertion sleeve comprises an open proximal end;

providing a camera assembly of the tip part, the camera assembly being able to provide an image from light received from an object to be investigated; and inserting the camera assembly into the camera insertion sleeve from the open proximal end of the camera insertion sleeve so that light received from an object to be investigated can pass through the camera window to the camera assembly.

In an embodiment the camera window is positioned in or forms part of the distal front wall.

In an embodiment the circumferential camera sleeve wall extends from the distal front wall of the housing to the proximal end of the camera insertion sleeve.

In an embodiment the camera assembly comprises a vision sensor, a lens stack, and a printed circuit board, and wherein the camera assembly is inserted into the camera insertion sleeve from the open proximal end of the camera insertion sleeve so that the vision sensor, the lens stack, and at least part of the printed circuit board are positioned within the camera insertion sleeve.

The methods according to this aspect of the present disclosure may be methods of manufacture of a tip part according to any one, or any combi-nation, of any one of the embodiments of tip parts as disclosed herein. The methods according to this aspect of the present disclosure may additionally or alternatively comprise any of the further method steps as disclosed herein, including those disclosed in relation to the tip parts of the present disclosure.

The camera assembly may be inserted into the camera insertion sleeve such that one or more light sources of the camera assembly abut one or more light guides of the exterior housing and/or circumferential housing wall and/or distal front wall and/or camera window and/or circumferential camera sleeve wall.

If the camera insertion sleeve and/or guide casing comprise one or more guide elements, the one or more guide elements may guide the camera assembly to a defined positioned during insertion into the camera insertion sleeve.

The camera assembly may be inserted into the camera insertion sleeve such that the lens stack is positioned in a lens stack holder of the camera window and/or distal front wall and/or circumferential camera sleeve wall.

If the camera assembly comprises a guide casing, the camera assembly may be inserted into the camera insertion sleeve such that the guide casing abuts the distal front wall and/or the camera window.

Subsequent to inserting the camera assembly, the camera assembly may be fluid sealed in the camera insertion sleeve by providing and adhesive and/or sealant at a proximal end of the camera assembly. The adhesive and/or sealant may be provided between the camera assembly and the circumferential camera sleeve wall and/or, if a guide casing is present, between the guide casing and the circumferential camera sleeve wall. The adhesive and/or sealant may be provided between an exterior surface of a proximal end of the camera assembly and/or guide casing if present, and an interior surface of the circumferential camera sleeve wall. The adhesive and/or sealant may be provided between an interior surface of the proximal end of the circumferential camera sleeve wall and an exterior surface of the camera assembly and/or guide casing if present.

This may provide a tip part that is easier to assemble. Furthermore, it may ensure correct positioning of the camera assembly within the tip part.

In a development of the previous embodiment, the method further comprises the step of integrally molding the exterior housing in one piece so that the distal front wall and the circumferential housing wall are molded in one piece with each other and so that the distal front wall and the camera insertion sleeve are integrally molded in one piece with each other.

In a development of the previous embodiment, the step of integrally molding the exterior housing in one piece further comprises that the circumferential housing wall and the camera insertion sleeve are integrally molded in one piece with each other.

The molding step may involve or consist of injection molding. Injection molding is typically efficient in terms of quick reproduction of identical items.

The first and/or second material may be selected from thermoplastic materials, thermoset materials, and elastomers. The second material may comprise or consist of a transparent material. The first material may be opaque at least in a set condition. The first material and said first polymer material may also be selected for other properties, such as good adhesion to sealant materials and adhesives. Thus, the set first material may have better adhesion properties to glue than the second material or the second polymer material.

The second material may be transparent and/or may include the camera window and potentially one or more light windows and/or may be provided as disclosed herein with respect to the description of the tip parts of this disclosure.

The method may be a method of manufacture of the tip part according to any one of the embodiments of tip parts as disclosed herein.

The methods according to this aspect of the present disclosure may further comprise the steps of, and/or a method of manufacture of the tip parts according to this disclosure may comprise:

providing a molding tool;

introducing a first melted material into the molding tool, wherein the first material may be said first polymer material on a melted form;

introducing at least one second melted material different from the first material into the molding tool, wherein the second material may be said second polymer material on a melted form;

allowing the second material to set and form a combined external housing with the first material; and removing the combined external housing from the molding tool.

This may allow the provision of an integrated unit for the tip external housing having different areas with different desired properties; specifically, the second material may form the camera window and potentially one or more light windows.

The molding tool may comprise a first cavity, a second cavity, and one or more cores. If applying injection molding, this may be advantageous since the molded object may shrink during cooling and therefore may tend to stick to the core. The first material may be allowed to set or partly set before the second material is introduced. This may provide well-defined boundaries between the two materials in the final integrated unit. Moreover, it may allow the first mold to stick to the core for the introduction into the second cavity of the molding tool. The volume of the second material introduced in the mold may be smaller than a volume of the first material introduced into the mold. This may be of advantage if the second material is more brittle than the first material because having a smaller volume thereof will make it less prone to stick to the mold due to shrinking, thereby making it easier to extract from the mold. Accordingly, the second material may also be injected at higher pressure than the first material because a high pressure used for the first material will make it more prone to sticking to the mold and/or core(s), in turn making removal more difficult. Accordingly, the introduction of the first and/or the second material may form part of an injection molding process.

The second material may comprise or consist of a transparent material. Injecting the transparent material as the second material may be advantageous because transparent materials, which are preferred for their optical properties, may then be introduced under higher pressure than the first material. This, in turn, may reduce shrinking and may provide improved control of the optical properties of the manufactured tip part. The second material, which may be more brittle, may generally constitute only a minor part of the total material of the exterior housing. This may make it is easier to remove the exterior housing from the mold. The first material may accordingly be opaque at least in its set form. The first material and said first polymer material may alternatively or additionally be selected for other properties, such as good adhesion to sealant materials and adhesives. Thus, the set first material may have better adhesion properties to glue than the second material or the second polymer material. The first cavity and the second cavity may have generally cylindrical shapes. This may result in a generally cylindrical exterior housing which, in turn, may be suitable for endoscopes made with the tip part according to the present disclosure.

In an embodiment, the method further comprises the step of integrally molding the exterior housing, the camera window, the camera insertion sleeve and potentially one or more tube insertion sleeves in one piece with each other in a multi-component molding process, in which molding process the exterior housing and the camera window are manufactured from two different materials.

Alternatively, in such a multi-component molding process, the window part is formed of the same material as the exterior housing, i.e. of the said first polymer material, which may in this case be transparent and/or translucent. In this case, either the exterior housing or the camera window may be manufactured with master batch, the other without.

A third aspect of the present disclosure relates to an endoscope comprising a tip part according to any one the embodiments of the first aspect and/or comprising a tip part manufactured according to any one of the embodiments of the second aspect.

The endoscope may be a disposable insertion endoscope. The endoscope may include one or more features as described herein in the above, including the features described in the above introduction to this description, and in connection with the description of the methods and tip parts according to the present disclosure.

The endoscope may comprise an elongated insertion tube with a handle at the proximal end. The tip part may be positioned at the distal end of the elongated insertion tube. The tip part may further comprise a bending section positioned between the tip part and the elongated insertion tube. The bending section may be configured to be articulated to maneuver the endo-scope inside a body cavity.

A fourth aspect of the present disclosure relates to a system comprising:

are endoscope comprising a tip part according to any one of the embodiments of the first aspect and/or comprising a tip part manufactured according to any one of the embodiments of the second aspect; and a display for displaying an image provided by the camera assembly.

A fifth aspect of the present disclosure relates to a tip part for forming a tip of a disposable insertion endoscope, the tip part comprising:

an exterior housing having an open proximal end for connection to other parts of the endoscope, the housing further having a distal front wall and a circumferential housing wall, the circumferential housing wall extending a total housing length H in a proximal direction from the distal front wall to the proximal end of the housing, the distal front wall and the circumferential housing wall enclosing an interior spacing of the tip part;

a camera assembly able to provide an image from light received from an object to be investigated; and a tube insertion sleeve provided within the interior spacing and fixed in relation to the distal front wall, the tube insertion sleeve being formed by a circumferential tube sleeve wall that extends a total tube sleeve length S from the distal front wall of the housing to a proximal end of the tube insertion sleeve so that the tube insertion sleeve comprises an open proximal end;

wherein the distal front wall has a fluid opening which is aligned with a distal end of the tube insertion sleeve, a proximal surface of the distal front wall surrounding the fluid opening to provide a tube abutment surface;

whereby a tube can be inserted through the proximal end of the tube insertion sleeve until a distal end of the tube abuts the tube abutment surface, whereby the distal end of the tube is positioned to allow fluid flow through the tube to and through the fluid opening.

The abutment surface may circumscribe the fluid opening. The abutment surface may be annular. A width of the abutment surface may be an extent the abutment surface extends from the tube sleeve wall to the fluid opening. A width of the abutment surface may extend from an interior surface of the tube sleeve wall to the fluid opening. The width may extend radially from the interior surface of the tube sleeve wall to the fluid opening. The width may extend substantially perpendicularly to the length of the tube sleeve wall. A width of the abutment surface may be measured radially from an interior surface of the tube sleeve wall and to the fluid opening. The width of the abutment surface may be equal to or less than 1/30, 1/29, 1/28, 1/27, 1/26, 1/25, 1/24, 1/23, 1/22, 1/21, 1/20, 1/19, 1/18, 1/17, 1/16, 1/15, 1/14, 1/13, 1/12, 1/11, 1/10, 1/9, 1/8, 1/7, 1/6, 1/5, 1/4, 1/3, 1/2, 2/5, 3/5, 2/3, 4/5, or 9/10 of the total tube sleeve length S. The width of the abutment surface may be equal to or less than a thickness of an inserted tube. The width may be equal to or greater than a thickness of an inserted tube. The width of the abutment surface may be equal to or less than a thickness of the tube sleeve wall. The width of the abutment surface may be equal to or greater than a thickness of the tube sleeve wall. The width of the abutment surface may be equal to or less than 10, 9, 8, 7, 6, 5, 4, 3, 2, 1, or 0.5 times a thickness of the tube sleeve wall.

The tube insertion sleeve may be formed integrally and in one piece with the exterior housing.

The circumferential tube sleeve wall may be at least partly formed by the circumferential housing wall. Alternatively, the circumferential tube sleeve wall may be formed separately of the circumferential housing wall i.e. not integrally or in one piece with the circumferential housing wall.

The tip part may comprise at least two, three, four, five, six or more tube insertion sleeves provided in the interior spacing. Each tube insertion sleeve may be formed by a circumferential tube sleeve wall. At least two, potentially at least three, potentially each, of the tube insertion sleeves may be at least partly formed by a common circumferential tube sleeve wall. The circumferential tube sleeve wall of at least one tube insertion sleeve may be at least partly formed by the circumferential housing wall and at least partly by a circumferential tube sleeve wall of an adjacent tube insertion sleeve. Each tube insertion sleeve may be at least partly formed by a circumferential tube sleeve wall of an adjacent circumferential tube sleeve wall. One or more circumferential tube sleeve walls may be formed separately of the circumferential housing wall i.e. not integrally or in one piece with the circumferential housing wall.

This may have the advantage of reducing the footprint and thereby the required space for each tube insertion sleeve whereby the cross-sectional extent and/or diameter of exterior housing may be reduced.

At least a part of two tube insertion sleeves extending side-by-side may include an open slot extending longitudinally between them.

The open slot may allow for the two tubes to be positioned close to, potentially abutting, each other along a longitudinal direction when the tubes are positioned in the tube insertion sleeves.

Potentially, parts of tube insertion sleeves along a longitudinal direction may be coinciding and/or parts of the circumferential tube sleeve walls may be removed from the cut-outs where the tube insertion sleeves intersect each other.

Accordingly, outlets from two tubes and/or open proximal ends of two tube insertion sleeves may be shaped like the number "8", especially if the tubes have a rounded or circular cross-section.

This embodiment may make it possible to minimize dimensions of the tube insertion sleeves and/or tubes since they are positioned very close to each other. This may, in turn, allow for a reduction of a total cross-sectional or radial extent of the tip part and/or the exterior housing.

This embodiment may also make it possible or at least easier to mold the tube insertion sleeves since there is a connection between them.

The tube, which may alternatively be denoted a pipe, may be a working channel tube, fluid supply tube, fluid suction tube, or the like.

A tube may be positioned in each tube insertion sleeve. Each tube may extend through the tip part, potentially to a respective fluid source. Each tube may be provided separately from or not in one piece with the exterior housing. One or more of the tubes may be for gas, one or more of the tubes may be for liquid, one or more of the tubes may be for rinsing fluid.

In the context of the present disclosure, a tube is any component which allows tight fluid flow through it and which has a length above zero.

Positioning of tubes in the tube insertion sleeves may occur subsequent to manufacture of the exterior housing including tube insertion sleeve and potentially the camera window and/or the camera insertion sleeve. The one or more tubes may be inserted into the tube insertion sleeves in a proximal to distal direction, potentially through a proximally positioned opening of the exterior housing.

An outer diameter or largest outer cross-section of an outer surface of each tube may correspond to the diameter or largest cross section of each corresponding tube insertion sleeve.

The one or more tubes may have a constant diameter along its/their length(s). The one or more tubes may be flexible and may comprise or consist of a plastic or polymer material, such as PET, PE, or PP. The one or more tubes may be tubular and/or may be cylindrical.

The tip part may comprise a nozzle. The nozzle may be positioned at or in the distal front wall. The nozzle may be integrally formed and in one piece with the distal front wall. The nozzle may generally be suitable for ejection of both gas and liquid. The nozzle outlet may generally be for ejection of both gas and liquid. The nozzle may be an outlet for one or more of the tube insertion sleeves and/or tubes.

The tip part, in particular the one or more tubes, may be connected to or be connectable to one or more fluid sources. The fluid provided from the fluid sources may be liquid and/or air or gas. The liquid may be water. The gas may be carbon dioxide. Ejection of liquid from or a liquid jet ejected or sprayed from the nozzle may be used for flushing with liquid and thereby cleaning at least part of the front surface of the camera window. Ejected gas may be used for cleaning remaining liquid on the camera window off after flushing with liquid. The ejected gas may also be used for expanding a body volume. The gas may also be used for accelerating or otherwise affecting the liquid flow and/or the liquid flushing process.

The tube insertion sleeve may be tubular. The tube insertion sleeve may be a cylindrical shell. The tube insertion sleeve may have a circular cross-section, potentially along an entire length of the tube insertion sleeve. The tube insertion sleeve may have circular end surfaces at its proximal end and/or distal end. The interior surface of the tube insertion sleeve may be complementary to an exterior surface of a tube to be inserted. The circumferential housing wall be annular.

In a development of the previous embodiment, the tube insertion sleeve is fluid tight and/or fluid sealed from a surrounding portion of the interior spacing.

The tube insertion sleeve may be fluid tight and/or fluid sealed against the distal front wall.

In an embodiment, the circumferential tube sleeve wall is at least partly formed by or coinciding with the circumferential housing wall.

In an embodiment, the tube insertion sleeve is formed integrally and in one piece with the distal front wall and/or with the circumferential housing wall.

The tube insertion sleeve, the distal front wall, and the circumferential housing wall may all be formed integrally and in one piece with each other. If the tip part comprises more than one tube insertion sleeve, one, or more, or all of the tube insertion sleeves may be formed integrally and in one piece with the distal front wall and/or the circumferential housing wall.

The tip part may comprise a camera insertion sleeve according to any one of the above embodiments.

A camera insertion sleeve may be positioned at a top of the interior spacing. A tube insertion sleeve for a working channel and working channel tube may be positioned below the camera insertion sleeve. One or more tube insertion sleeves may be positioned in a lateral spacing next to the working channel tube. The camera insertion sleeve and tube insertion sleeve for the working channel tube may delimit a lateral spacing within the tip part. One or more tube insertion sleeves such as for fluid supply, rinsing fluid, and/or fluid extraction may be positioned in the lateral spacing.

The tube insertion sleeve may be at least partly formed by or coinciding with the camera insertion sleeve. The tube insertion sleeve may be integrally molded in one piece with the camera insertion sleeve.

The tip part may comprise at least two, three, four, five, or six such tube insertion sleeves. The tube insertion sleeves may be distributed in a cross-section of the exterior housing and/or next to each other in a radial direction of the distal front wall the tube insertion sleeves may be positioned above or below and/or laterally next to each other in the cross-section of the exterior housing. The tube insertion sleeves may be positioned such that they partly coincide with each other and/or the circumferential housing wall and/or the camera insertion sleeve. At least two, three, four, five, six, or more tube insertion sleeves may be at least partly formed by or coinciding with the camera insertion sleeve. At least two, three, four, five, six, or more tube insertion sleeves may be integrally molded in one piece with the camera insertion sleeve.

The tip part may further comprise a camera window positioned at least partly in front of the vision device, the camera window being positioned in or forming part of the distal front wall so that light received from the object can pass through the window to the vision device.

In an embodiment, the total sleeve length S is less than the total housing length H.

The total sleeve length S may be equal to or less than $9/10$, $8/10$, $7/10$, $6/10$, $5/10$, $4/10$, $3/10$, $2/10$, $1/10$ of the total housing length H. Alternatively, the total sleeve length S is greater than the total housing length.

In an embodiment, the tube abutment surface is positioned equal to or less than $3/10$ of the total housing length H from a distal end surface of the distal front wall in the distal-proximal direction.

The tube abutment surface may be positioned equal to or less than $2/10$ or $1/10$, $1/11$, $1/12$, $1/13$, $1/14$, $1/15$, $1/16$, $1/17$, $1/18$, $1/19$, or $1/20$ of the total housing length H from the distal end surface of the distal front wall. This may allow the tube to be positioned deeper in the tip part and reduce the material required by the tip part in proximal-distal direction which may allow the tip part to be made more compact in a longitudinal direction.

In an embodiment, a tube, such as a working channel tube, fluid supply tube, fluid suction tube, or the like is inserted in the tube insertion sleeve, a distal end of the tube abutting the tube abutment surface, whereby the distal end of the tube is positioned to allow fluid flow through the tube to and through the fluid opening.

In a development of the previous embodiment, the inserted tube is fluid sealed against the tube insertion sleeve by an adhesive and/or sealant.

This may provide a fluid sealed tube in the tip part which may improve the fluid tightness of the tip part and reducing the risk of leakage internally in the tip part, which may reduce the requirements for other fluid sealing of the tip part and/or electrical components in the tip part.

The adhesive and/or sealant may be provided at the proximal end of the tube sleeve wall between the inserted tube and the tube sleeve wall. The adhesive and/or sealant may be provided between an interior surface of the circumferential tube sleeve wall and an exterior surface of the inserted tube. The adhesive and/or sealant may be provided between an interior surface of the proximal end of the tube insertion sleeve and an exterior surface of the inserted tube. Adhesive and/or sealant may be provided between a distal end surface of the tube and the abutment surface.

In an embodiment, an adhesive and/or sealant is provided between the abutment surface and the inserted tube.

In an embodiment, an adhesive and/or sealant is provided between an interior surface of the circumferential tube sleeve wall and the inserted tube.

In an embodiment, the interior spacing is substantially filled with an adhesive and/or sealant. The interior spacing may be substantially filled with an adhesive and/or sealant up to an adhesive and/or sealant level. The adhesive and/or sealant level may substantially coincide with the proximal end of the exterior housing. This may improve electrical insulation, fluid tightness and/or stability of tip part.

In an embodiment, the tip part further comprises a second tube insertion sleeve and the circumferential tube sleeve wall of at least one of the tube insertion sleeves is at least partly formed by or coinciding with the circumferential housing wall and at least partly formed by or coinciding with the circumferential tube sleeve wall of the other tube insertion sleeve.

In an embodiment, the tip part comprises at least three tube insertion sleeves, and the circumferential tube sleeve wall of at least one of the tube insertion sleeves is at least partly formed by or coinciding with the circumferential tube sleeve walls of the two other tube insertion sleeves.

In a development of the previous embodiment, the circumferential tube sleeve wall of the at least one tube insertion sleeves is at least partly formed by or coinciding with the circumferential tube sleeve walls of the two other tube insertion sleeves and also at least partly formed by or coinciding with the circumferential housing wall.

The circumferential tube sleeve wall of at least two, three, four or more tube insertion sleeves may be at least partly formed by or coinciding with the circumferential tube sleeve walls of at least one, two, three, four or more other tube insertion sleeves and also at least partly formed by or coinciding with the circumferential housing wall. This may reduce the footprint required by the tube insertion sleeves by "sharing" parts of their respective circumferential tube sleeve walls with other tube insertion sleeves. Reducing the space required by the tube insertion sleeves may allow the diameter of the exterior housing to be reduced.

In an embodiment, the tip part further comprises a camera insertion sleeve according to any one of the preceding claims, wherein at least one tube insertion sleeve is at least partly formed by and/or coinciding with the circumferential camera sleeve wall.

A sixth aspect of the present disclosure relates to a method of manufacture of a tip part, the tip part being for forming a tip of a disposable insertion endoscope, the method comprising:

providing an exterior housing of the tip part having an open proximal end for connection to other parts of the endoscope, the housing further having a distal front wall and a circumferential housing wall, the circumferential housing wall extending a total housing length H in a proximal direction from the distal front wall to the proximal end of the housing, the distal front wall and the circumferential housing wall enclosing an interior spacing of the tip part;

providing a tube insertion sleeve of the tip part within the interior spacing and fixed in relation to the distal front wall, the tube insertion sleeve being formed by a circumferential tube sleeve wall that extends a total tube sleeve length S from the distal front wall of the housing to a proximal end of the tube insertion sleeve so that the tube insertion sleeve comprises an open proximal end;

providing a camera assembly able to provide an image from light received from an object to be investigated;

providing a tube of the tip part; and wherein the distal front wall has a fluid opening which is aligned with a distal end of the tube insertion sleeve, a proximal surface of the distal front wall surrounding the fluid opening to provide a tube abutment surface;

inserting the tube into the tube insertion sleeve through the proximal end of the tube insertion sleeve until a distal end of the tube abuts the tube abutment surface, whereby the distal end of the tube is positioned to allow fluid flow through the tube to and through the fluid opening.

In a development of the previous embodiment, the method further comprises the step of providing an adhesive and/or sealant between a distal end of the tube and the abutment surface.

In an embodiment, the method further comprises the step of providing an adhesive and/or sealant between an interior surface of the tube insertion sleeve and an exterior surface of the tube.

The methods according to this aspect of the present disclosure may be methods of manufacture of a tip part according to any one, or any combi-nation, of any one of the embodiments of tip parts as disclosed herein. The methods according to this aspect of the present disclosure may additionally or alternatively comprise any of the further method steps as disclosed herein, including those disclosed in relation to the tip parts of the present disclosure.

Additionally or alternatively, an adhesive and/or sealant may be provided at a proximal end of the tube insertion sleeve. The adhesive and/or sealant may be provided between an interior surface of the proximal end of the circumferential tube sleeve wall and an exterior surface of the tube. In this way, the tube may be fluid sealed in the tube insertion sleeve.

This may provide a tip part that is easier to assemble. Furthermore, it may ensure correct positioning of the camera assembly within the tip part.

In an embodiment, the method further comprises the step of integrally molding the exterior housing in one piece so that the distal front wall and the circumferential housing wall are molded in one piece with each other and so that the distal front wall and the tube insertion sleeve are integrally molded in one piece with each other.

If the tip part comprises more than one tube insertion sleeve, each tube insertion sleeve may be integrally molded in one piece with the distal front wall.

In a development of the previous embodiment, the step of integrally molding the exterior housing in one piece further comprises that the circumferential housing wall and the tube insertion sleeve are integrally molded in one piece with each other.

If the tip part comprises more than one tube insertion sleeve, each tube insertion sleeve may be integrally molded in one piece with the circumferential housing wall.

The molding step may involve or consist of injection molding. Injection molding is typically efficient in terms of quick reproduction of identical items.

The first and/or second material may be selected from thermoplastic materials, thermoset materials, and elastomers. The second material may comprise or consist of a transparent material. The first material may be opaque at least in a set condition. The first material and said first polymer material may also be selected for other properties, such as good adhesion to sealant materials and adhesives. Thus, the set first material may have better adhesion properties to glue than the second material or the second polymer material.

The second material may be transparent and/or may include the camera window and potentially one or more light windows and/or may be provided as disclosed herein with respect to the description of the tip parts of this disclosure.

The method may be a method of manufacture of the tip part according to any one of the embodiments of tip parts as disclosed herein.

The methods according to this aspect of the present disclosure may further comprise the steps of, and/or a method of manufacture of the tip parts according to this disclosure may comprise:

providing a molding tool;

introducing a first melted material into the molding tool, wherein the first material may be said first polymer material on a melted form;

introducing at least one second melted material different from the first material into the molding tool, wherein the second material may be said second polymer material on a melted form;

allowing the second material to set and form a combined external housing with the first material; and removing the combined external housing from the molding tool.

This may allow the provision of an integrated unit for the tip external housing having different areas with different desired properties; specifically, the second material may form the camera window and potentially one or more light windows.

The molding tool may comprise a first cavity, a second cavity, and one or more cores. If applying injection molding, this may be advantageous since the molded object may shrink during cooling and therefore may tend to stick to the core. The first material may be allowed to set or partly set before the second material is introduced. This may provide well-defined boundaries between the two materials in the final integrated unit. Moreover, it may allow the first mold to stick to the core for the introduction into the second cavity of the molding tool. The volume of the second material introduced in the mold may be smaller than a volume of the first material introduced into the mold. This may be of advantage if the second material is more brittle than the first material because having a smaller volume thereof will make it less prone to stick to the mold due to shrinking, thereby making it easier to extract from the mold. Accordingly, the second material may also be injected at higher pressure than the first material because a high pressure used for the first material will make it more prone to sticking to the mold and/or core(s), in turn making removal more difficult. Accordingly, the introduction of the first and/or the second material may form part of an injection molding process.

The second material may comprise or consist of a transparent material. Injecting the transparent material as the second material may be advantageous because transparent materials, which are preferred for their optical properties, may then be introduced under higher pressure than the first material. This, in turn, may reduce shrinking and may provide improved control of the optical properties of the manufactured tip part. The second material, which may be more brittle, may generally constitute only a minor part of the total material of the exterior housing. This may make it is easier to remove the exterior housing from the mold. The first material may accordingly be opaque at least in its set form. The first material and said first polymer material may alternatively or additionally be selected for other properties, such as good adhesion to sealant materials and adhesives. Thus, the set first material may have better adhesion properties to glue than the second material or the second polymer material. The first cavity and the second cavity may have generally cylindrical shapes. This may result in a generally cylindrical exterior housing which, in turn, may be suitable for endoscopes made with the tip part according to the present disclosure.

In an embodiment, the method further comprises the step of integrally molding the exterior housing, the camera window, the camera insertion sleeve and potentially one or more tube insertion sleeves in one piece with each other in a multi-component molding process, in which molding process the exterior housing and the camera window are manufactured from two different materials.

Alternatively, in such a multi-component molding process, the window part is formed of the same material as the exterior housing, i.e. of the said first polymer material, which may in this case be transparent and/or translucent. In this case, either the exterior housing or the camera window may be manufactured with master batch, the other without.

A seventh aspect of the present disclosure relate to an endoscope comprising a tip part according to any one of the embodiments of the fifth aspect and/or comprising a tip part manufactured according to any one of the embodiments of the sixth aspect.

The endoscope may be a disposable insertion endoscope. The endoscope may include one or more features as described herein in the above, including the features described in the above introduction to this description, and in connection with the description of the methods and tip parts according to the present disclosure.

The endoscope may comprise an elongated insertion tube with a handle at the proximal end. The tip part may be positioned at the distal end of the elongated insertion tube. The tip part may further comprise a bending section positioned between the tip part and the elongated insertion tube. The bending section may be configured to be articulated to maneuver the endo-scope inside a body cavity.

An eight aspect of the present disclosure relates to a system comprising:
an endoscope comprising a tip part according to any one of the embodiments of the fifth aspect and/or comprising a tip part manufactured according to any one of the embodiments of the sixth aspect; and
a display for displaying an image provided by the camera assembly.

A ninth aspect of the present disclosure relates to a tip part for forming a tip of a disposable insertion endoscope, the tip part comprising:
an exterior housing having an open proximal end for connection to other parts of the endoscope, the housing further having a distal front wall and a circumferential housing wall, the circumferential housing wall extending in a proximal direction from the distal front wall to the proximal end of the housing, the distal front wall and the circumferential housing wall enclosing an interior spacing of the tip part;
a camera assembly able to provide an image from light received from an object to be investigated; and
wherein the circumferential housing wall comprises at least one cut-out extending from the proximal end towards the distal front wall, the at least one cut-out leaving space for constructive elements within the at least one cut-out, such constructive elements comprising e.g. fixation, such as crimps, of steering wires and/or alignment elements for alignment of the tip part during manufacture.

This may allow constructive elements to be positioned within the housing and so reduce exterior dimensions of the exterior housing. Furthermore, it may allow easier assembly by a worker as the tip part may be easily aligned with other components such as a bending section to be attached to the tip part.

In the context of the present disclosure a cut-out is a hole cut through something to allow the insertion of something else.

The circumferential housing wall may comprise at least two, three, tour or more cut-outs. If the circumferential housing wall comprises at least two or more cut-outs, the cut-outs may be distributed symmetrically or anti-symmetrically in the circumference of the circumferential housing wall.

It the circumferential housing wall comprises at least two or more cut-outs, the cut-outs may be spaced by 5, 10, 15, 20, 25, 30, 35, 40, 45, 50, 55, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 355 or more degrees circumferentially.

The at least one cut-out may have a substantially rectangular or square shape. The at least one cut-out may taper towards the distal front wall. When the circumferential wall comprises more than one cut-out, the cut-outs may have different sizes and/or shapes.

The at least one cut-out may extend in the proximal distal direction equal to or more than $1/20$, $1/19$, $1/18$, $1/17$, $1/16$, $1/15$, $1/14$, $1/13$, $1/12$, $1/11$, $1/10$, $1/9$, $1/8$, $1/7$, $1/6$, $1/5$, $1/4$, $1/3$, $1/2$, $3/5$, $2/3$ or more of a total housing length H.

The at least one cut-out may extend circumferentially equal to or more than $1/20$, $1/19$, $1/18$, $1/17$, $1/16$, $1/15$, $1/14$, $1/13$, $1/12$, $1/11$, $1/10$, $1/9$, $1/8$, $1/7$, $1/6$, $1/5$, $1/4$, $1/3$ or more of a circumference and/or total housing length H of the circumferential housing wall.

All the embodiments of the first to fourth aspects may also be according to the embodiments of the fifth to eighth aspects and according to the embodiments of the ninth aspect.

In an embodiment, a tip part is according to any one of the embodiments of the first aspect and any one of the embodiments of the fifth aspect.

In an embodiment, a tip part is according to any one of the embodiments of the first aspect and any one of the embodiments of the ninth aspect.

In an embodiment, a tip part is according to any one of the embodiments of the fifth aspect and any one of the embodiments of the ninth aspect.

A tenth aspect of the invention relates to a tip part for forming a tip of a disposable insertion endoscope, the tip part comprising:
- an exterior housing having an open proximal end for connection to other parts of the endoscope, the housing further having a distal front wall and a circumferential housing wall, the circumferential housing wall extending a total housing length H in a proximal direction from the distal front wall to the proximal end of the housing, the distal front wall and the circumferential housing wall enclosing an interior spacing of the tip part;
- a camera window positioned in or forming part of the exterior housing;
- a camera insertion sleeve provided within the interior spacing, the camera insertion sleeve being formed by a circumferential camera sleeve wall that extends from a distal end of the housing to a proximal end of the camera insertion sleeve so that the camera insertion sleeve comprises an open proximal end;
- a camera assembly able to provide an image from light received from an object to be investigated;
- a tube insertion sleeve provided within the interior spacing and fixed in relation to the distal front wall, the tube insertion sleeve being formed by a circumferential tube sleeve wall that extends a total tube sleeve length S from the distal front wall of the housing to a proximal end of the tube insertion sleeve so that the tube insertion sleeve comprises an open proximal end;
- wherein the camera assembly is inserted into the camera insertion sleeve so that light received from an object to be investigated can pass through the camera window to the camera assembly; and
- wherein the distal front wall has a fluid opening which is aligned with a distal end of the tube insertion sleeve, a proximal surface of the distal front wall surrounding the fluid opening to provide a tube abutment surface;
- whereby a tube can be inserted through the proximal end of the tube insertion sleeve until a distal end of the tube abuts the tube abutment surface, whereby the distal end of the tube is positioned to allow fluid flow through the tube to and through the fluid opening.

A person skilled in the art will appreciate that any one or more of the above aspects of this disclosure and embodiments thereof may be combined with any one or more of the other aspects and embodiments thereof.

BRIEF DESCRIPTION OF DRAWINGS

In the following, non-limiting exemplary embodiments will be described in greater detail with reference to the drawings, in which.

DETAILED DESCRIPTION

Figure 1:
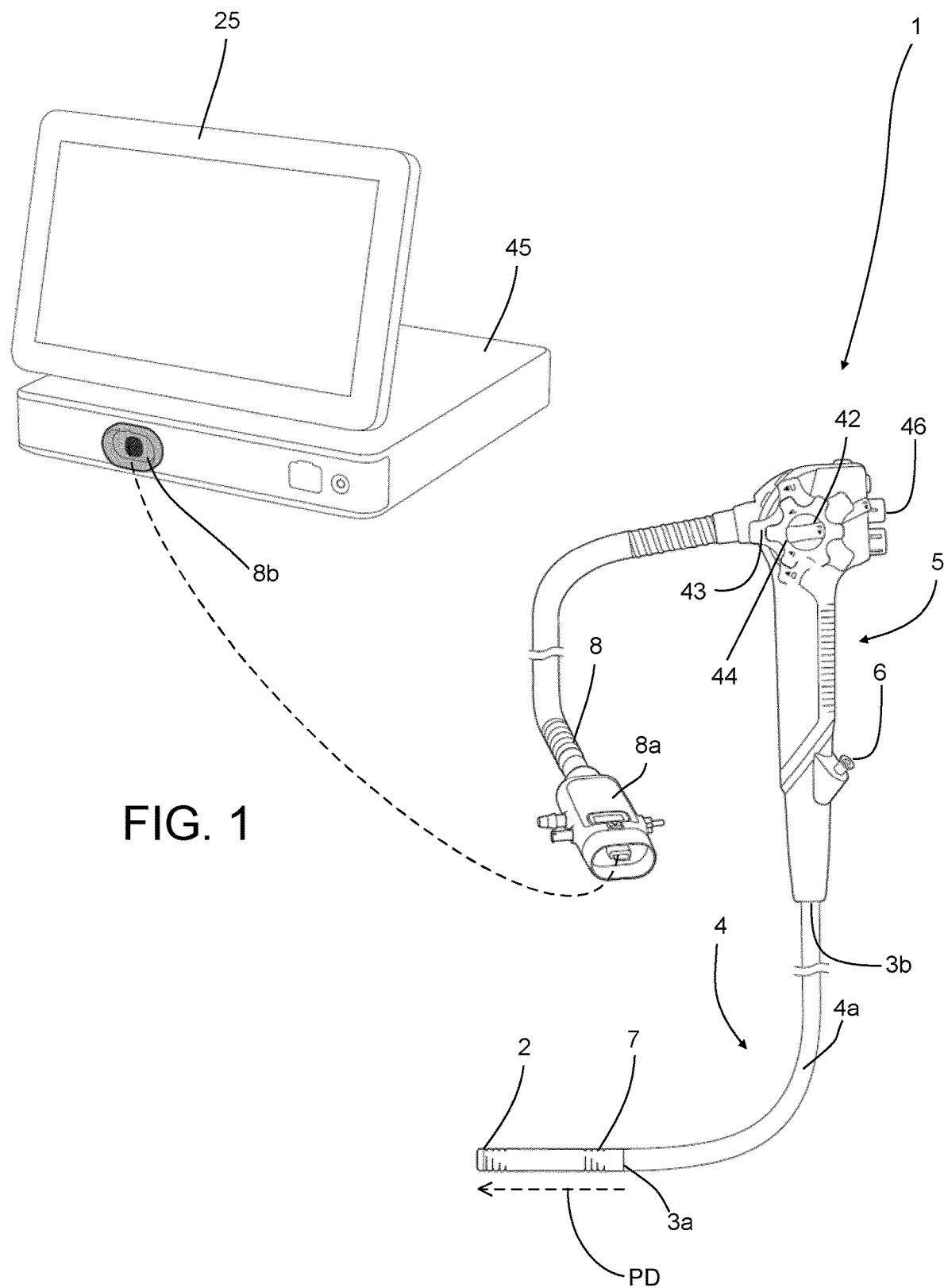
FIG. 1 shows an embodiment of a system comprising a disposable insertion endoscope and a display according to the present disclosure.
Figure 2:
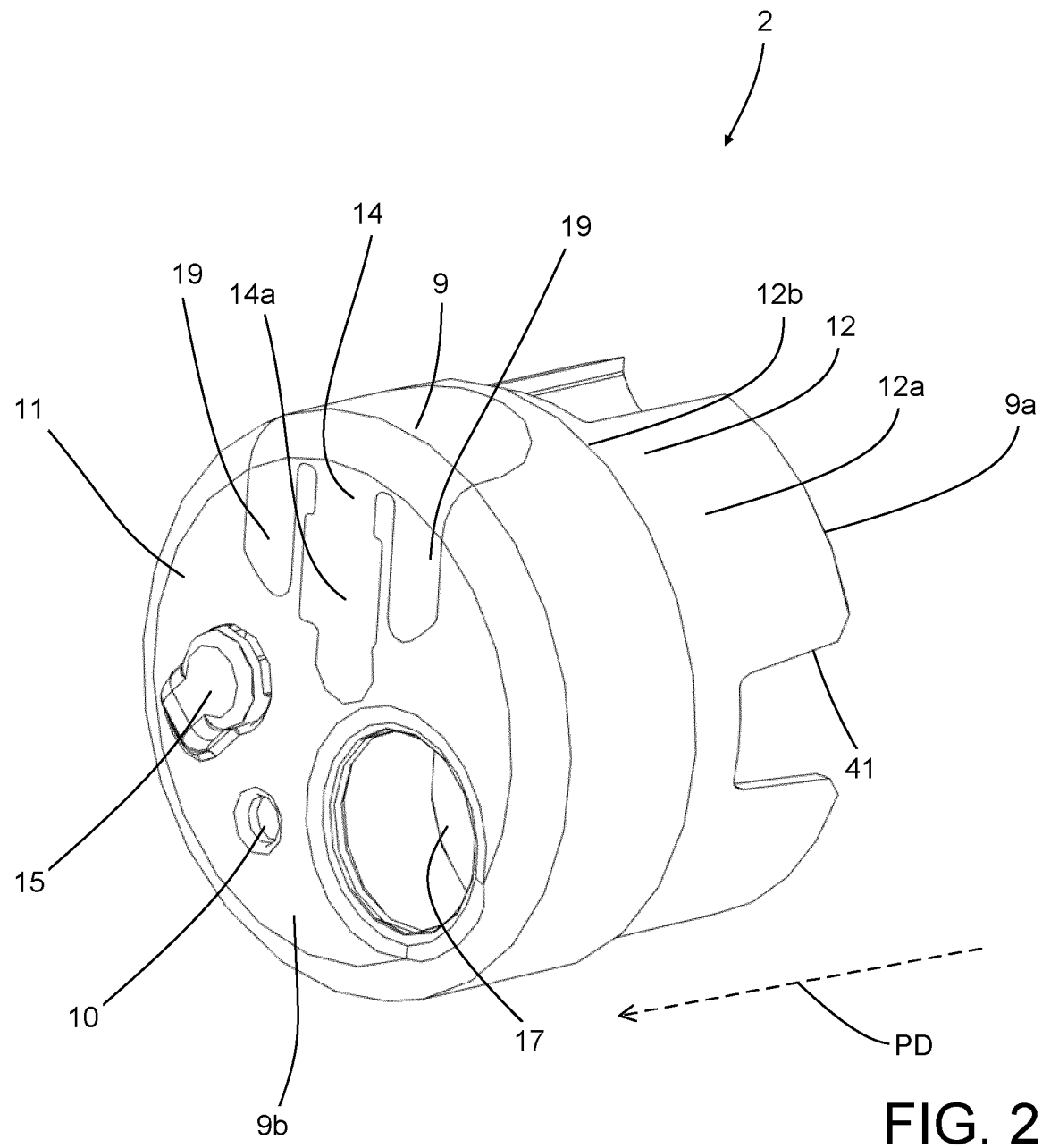
FIG. 2 shows a front perspective view of a tip part of the endoscope of FIG. 1.

FIG. 1 shows an endoscope 1 according to an embodiment of the endoscopes of the present disclosure, in particular a gastroscope. In other embodiments, the endoscope is another type of endoscope, such as a bronchoscope, urethroscope, a colonoscope, a rhinolaryngoscope, a cystoscope, or a duodenoscope. The endoscope 1 is or can be connected to a display 26 shown in FIG. 1. The endoscope 1 is disposable and single-use, i.e. not intended to be cleaned and reused. The endoscope 1 comprises an elongated insertion tube 4. At a proximal end 3b of the insertion tube 4, an operating handle 5 is arranged. The operating handle 5 has a control lever 42, which is known per se and comprises two control knobs 43, 44, respectively, for maneuvering a tip part assembly including the tip part 2 and bending section 7 attached at a distal end of the insertion tube 4 by means of one or more not shown steering wires. In a known operation of the control lever 42, each knob 43, 44 is operated by one or more fingers of an operator to control a bending operation of the tip of the endoscope 1, through the bending section 7 which allows bending in two dimensions, each direction corresponding to the operation of one of the two knobs 43, 44. The control lever 42 can comprise a known locking or arresting mechanism, upon activation of which a selected bending configuration of the tip can be achieved in a known manner. Other known types of control systems could alternatively be implemented in the endoscopes of the present disclosure.

The tip part 2 is positioned at a distal end 3a of an elongated insertion tube 4 of the endoscope 1. In the shown embodiment, the bending section 7 is positioned between the tip part 2 and the insertion tube 4. The bending section 7 is configured to be articulated to maneuver the endoscope 1 inside a body cavity. The handle 5 is connected to a fluid hose 8 for supplying fluid to the tip part 2. The fluid hose 8 is to be connected, via plug 8a, to the plug receiver 8b of the combined image processing and fluid supply unit 45. Flow of fluid through the endoscope 1 can be controlled via control dials 46. The plug 8a also comprises electric wires for connecting the display 26 to the endoscope 1 to display and view an image provided by the camera assembly 27. A working channel inlet 6 is also provided on the handle 5.

FIGS. 2 to 7 show different views of the tip part 2. The tip part 2 includes an exterior housing 9 having an open proximal end 9a for connection to the more proximally positioned parts of the endoscope 1. The housing 9 further comprises a distal front wall 11, wherein a cylindrically shaped circumferential housing wall 12 of the housing 9 extends from a distal front end 9b of the housing 9 to the proximal end 9a of the housing 9. The circumferential housing wall 12 and the front wall 11 enclose an interior spacing 24 accommodating camera assembly 27 with a vision sensor 29 able to provide an image from light received from an object to be investigated. The front wall 11 is positioned oppositely from the proximal end 9a of the housing 9 and coincides with the distal end of the tip part 2. The circumferential housing wall 12 extends from the front wall 11 to the proximal end 9a of the housing 9.

The housing 9 further comprises a nozzle 15 provided at the distal end of the tip part 2 for flushing an exterior surface 14a of a camera window 14 with a liquid transferred to the nozzle 15 from the fluid source.

The front wall 11 and the circumferential housing wall 12 are integrally molded from a first polymer material and are in one piece with each other. The front wall 11, the nozzle 15, are similarly integrally molded from said first polymer material and are in one piece with each other. The front wall 11, the circumferential housing wall 12, and the nozzle 15 are integrally molded from a first polymer material and are in one piece with each other.

The exterior housing 9 is generally cup-shaped, the cup being formed by the front wall 11 and the circumferential housing wall 12.

The nozzle 15 is a liquid nozzle for ejection of liquid and also functions as a gas nozzle for ejection of gas.

Said first polymer material is opaque and consists of, or comprises or consists essentially of, a thermoplastic polymer. The camera window 14 is manufactured of a second polymer material which is transparent and similarly comprises a thermoplastic polymer.

The circumferential housing wall 12 is a circumferentially extending cylindrical wall which has a generally cylindrical outer surface 12a and includes a step 12b for positioning of a flexible external sleeve or outer sheath 4a which extends from the proximal end 3b to the step 12b, surrounding the insertion tube 4 and part of the tip part 2.

The front wall 11 of the housing 9 includes liquid and gas fluid openings 16a, 16b which is an opening in the front wall 11 for introducing liquid into the nozzle 15. The front wall 11 of the housing 9 also includes a working channel opening 17 and a rinsing fluid opening 10 for ejecting a water jet.

The tip part 2 or the endoscope 1 further comprises the bending section 7 which has a distal end segment, a distal end of the bending section 7 and the proximal open end 9a of the housing 9 being adjoined to each other by means of articulated sections, a proximal end section of the latter being adjoined to the tip part 2.

A camera window 14 is positioned in front of the vision sensor 29, the camera window 14 being positioned in the front wall 11 so that light received from the object can pass through the window 14 to the vision sensor 29 as is conventional in endoscopes.

The camera window 14 comprises a second polymer material, which is different from said first polymer material of the exterior housing 9. The camera window 14 and the exterior housing 9 are integrally molded in one piece by a multi-component molding process according to the methods of the second aspect of this disclosure. The exterior front surface 14a of the camera window 14 is located in the same plane as a front surface of the exterior housing 9, specifically of the front wall 11.

A distal front surface of the camera window 14 extends along the distal end surface of the tip part 2 in a plane common with a distal end surface of the front wall 11. The camera window 14 is also positioned so that its distal end surface extends from the distal surface of the camera window 14 into the circumferential housing wall 12 to have a side surface completing the cylindrical external surface of the circumferential housing wall 12. The camera window 14 comprises several window parts, all being in one piece with each other. The camera window 14 can potentially be said to form part of the exterior housing 9, a distal front surface of the camera window 14 forming part of a distal surface of the housing 9 or the front wall 11 thereof, and the side surface of the camera window 14 forming part of the circumferential side surface of the housing 9 or the circumferential housing wall 12.

The camera window 14 is a distal front window allowing the camera assembly 27 to receive image information from the distal end of the tip part 2, i.e. from an object, such as a body cavity or body part, positioned in front of the camera window 14. The exterior distal front surface of the camera window 14 can be considered as forming part of the distal front wall 12 of the exterior housing 14.

The entire camera window 14 is integrally molded in one piece with the exterior housing 9 in a two-component molding process, see further below. The camera window 14 consists of a second, transparent plastic polymer material, this second polymer material being different from said first polymer material of which the exterior housing including the circumferential housing wall 12 and the front wall 11 are molded.

As mentioned, the exterior housing 9 including the circumferential housing wall 12, the front wall 11 and the camera window 14 have been manufactured in a two-component molding process, whereby the camera window is integrally molded in one piece with the front wall 11, the circumferential housing wall 12, and the nozzle 15.

The camera window 14 includes a camera window part 18 positioned in front of the vision sensor 29 positioned within the tip part 2 and two light window parts 19 extending to be positioned in front of two light sources 30, specifically LEDs, which are positioned within the tip part 2. Alternatively, the camera window part 18 can be considered "the camera window", and the light window parts can be considered "light windows". The light window parts 19 are for distribution of light from the LEDs positioned within the spacing of the exterior housing 9. The camera window part 18 and the light window parts 19 are integrally molded in one piece with each other.

Figure 3:
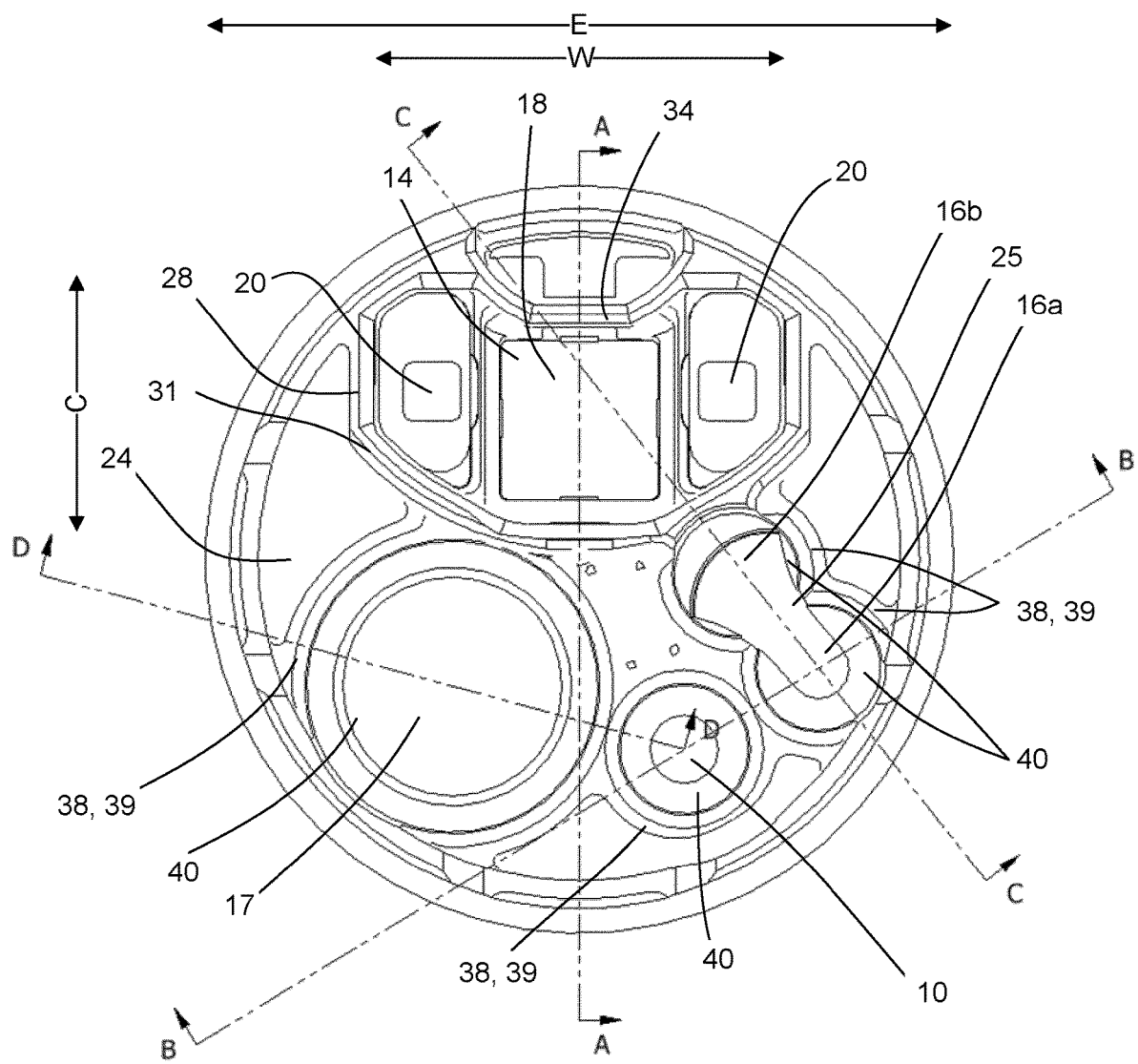
FIG. 3 shows a rear view of the tip part of FIG. 2.

As shown in FIG. 3, the camera window part 18 is positioned with a center line of the camera window coinciding with a center line A-A of the distal front surface or the front wall 11 of the tip part 2 and of the exterior housing 9. The two light window parts 19 are positioned one on each side of the camera window part 18, symmetrically with respect to and with an equal distance to the center line A-A.

Alternatively, in a not shown embodiment, the camera window 14 is instead a side window, for instance if the endoscope were a duodenum endoscope. In this case, the front wall 11 can be a side front wall positioned at a lateral side surface of the tip part 2. Such a side window may allow the camera assembly to receive image information from a side, potentially from a radial direction, of the tip part 2. Accordingly, the front wall 11 may be a side front wall instead of a distal front wall as shown in the embodiment of the drawings.

In the embodiment shown in the figures, the light window parts 19 of the camera window 14 each includes a light guide 20, which each extends proximally from the distal front surface of the camera window 14 towards each of the two LEDs. One LED is positioned at a proximal end of each light guide 20. The camera window part 18 and the light windows 19 including the light guides 20 are integrally molded in one piece with each other from the said second polymer material. The light guides 20 are similarly transparent and convey and control light from the LEDs as is known in the art.

The nozzle 15 is formed integrally with the front wall 11 as a single piece of the one or the first polymer material from which the exterior housing 9 including the front wall 11 and the circumferential housing wall 12 are molded. This first polymer material is opaque, which allows the introduction of not shown shading parts reducing stray light and glare into the vision sensor.

The first polymer material has better adhesion properties to glue than the second polymer material. This allows the circumferential housing wall 12 to adhere efficiently to a sealing glue sealing the interior spacing, and for the outer sheath 4a covering the insertion tube 4 to be securely adhered to the part of exterior surface of the circumferential housing wall 12 extending proximally from the step 12b.

The first and second polymer materials are thermoplastic polymer materials which allows the exterior housing 9 including the camera window 14 to be produced by injection molding in said two-component molding process.

Hereby, the front wall 11, the circumferential housing wall 12 and the camera window form a liquid-tight (except for intended outlets and openings) barrier or border between an exterior of the tip part 2 or the environment and the interior spacing 24 of the tip part 2.

By integrally forming the circumferential housing wall and camera window, a sealed tip part 2 is provided. Additionally, assembly of the tip part 2 is made simpler since fewer parts are required.

The distal, exterior front surface of the tip part 2 or front surface 11 is substantially planar.

The circumferential housing wall 12 extends from this front surface along lateral sides of the components positioned within the interior spacing. The circumferential housing wall 12 thus extends in the direction PD shown in FIG. 1. The front wall 11 extends in a direction transverse to the direction PD.

The tip part 2 further comprises a camera insertion sleeve 28 provided within the interior spacing 24, the camera insertion sleeve being formed by a circumferential camera sleeve wall 31 that extends from the distal front wall 11 of the housing 9 to a proximal end of the camera insertion sleeve 28 so that the camera insertion sleeve comprises an open proximal end. The camera assembly 27 being able to provide an image from light received from an object to be investigated and comprising a vision sensor 29, a lens stack 32, and a printed circuit board (PCB) 33.

Figure 6:
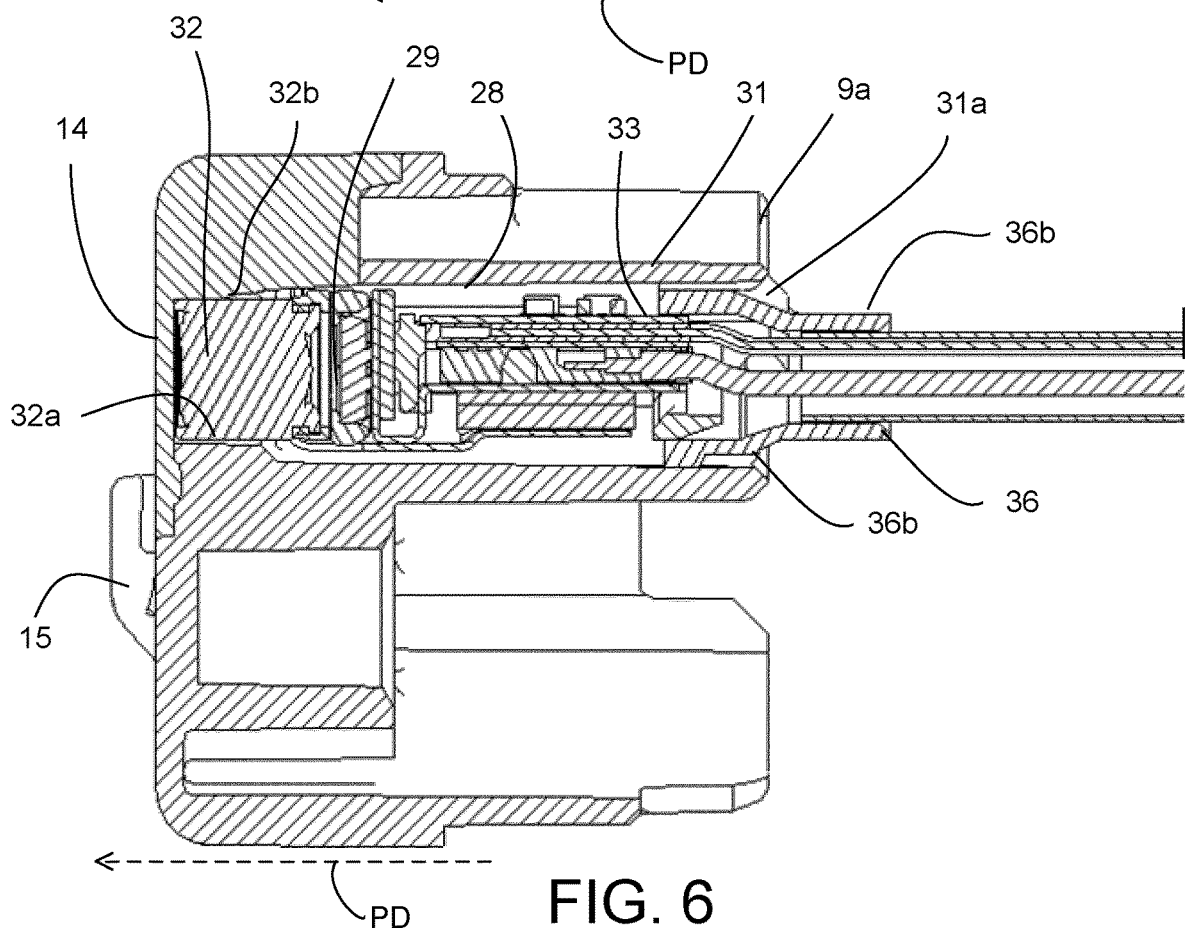
FIG. 6 shows the cross-sectional view of the tip part of FIG. 5 with inserted camera assembly.
Figure 7:
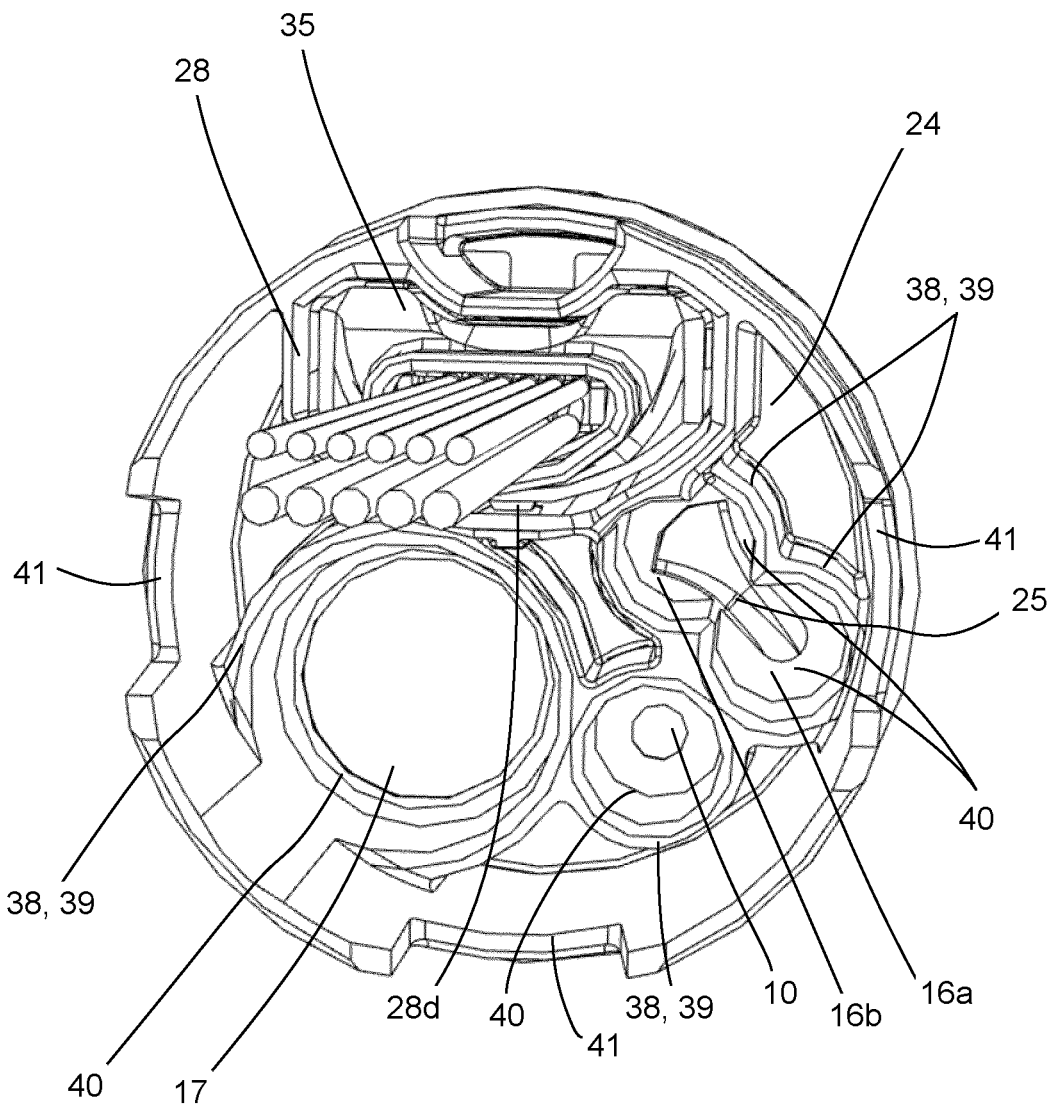
FIG. 7 shows a perspective rear view of the tip part of FIG. 2 with inserted camera assembly.

The camera assembly 27 is inserted into the camera insertion sleeve 28 so that the vision sensor 29, the lens stack 32, and at least part of the printed circuit board 33 are positioned within the camera insertion sleeve 28, and so that light received from an object to be investigated can pass through the camera window 14 to the camera assembly 27, see especially FIG. 6.

The circumferential camera sleeve wall 31 extends from the camera window 14 to the proximal end of the camera insertion sleeve 28. The circumferential camera sleeve wall 31 and the camera insertion sleeve 28 comprise the first polymer material i.e. the same material as the exterior housing 9.

The camera insertion sleeve may be positioned between proximal and distal ends of the interior spacing 24 and the circumferential housing wall 12. The circumferential camera sleeve wall 31 extends from the distal front wall 11 of the housing 9 to the proximal end 9a of the of the housing 9. The proximal end 28a of the camera insertion sleeve 28 extends to the proximal end 9a of the housing 9. The circumferential camera sleeve wall 31 is partly formed by and coinciding with the circumferential housing wall 12.

The camera insertion sleeve 28 comprises a lens stack holder 32a in which the lens stack 32 is inserted. The lens stack 32 is inserted into the lens stack holder 32a when the camera assembly 27 is inserted into the camera insertion sleeve 28. The lens stack holder 32a has a shape that is complementary to a shape of the lens stack 32. The lens stack holder 32a is positioned at a distal end of the camera insertion sleeve 28 and centrally in a cross-section of the camera insertion sleeve 28. The lens stack holder 32a is positioned between two light guides 20. The lens stack holder 32a extends into the distal front wall 11. The two light guides 20 extend in the proximal-distal direction along opposite sides of the lens stack holder 32a. A part of the lens stack holder 32a is formed in the distal front wall 11. The lens stack holder 32a is provided within the circumferential camera sleeve wall 31.

The camera insertion sleeve 28 comprises opposing vertical surfaces 28b which are sides, which may be denoted lateral sides, of the camera insertion sleeve 28 and the camera assembly 27 when the camera assembly is inserted. The opposing vertical surfaces 28b extend from respective light guides 20, next to light sources 30 of the camera assembly 27 when inserted, and to the proximal end 28a of the camera insertion sleeve 28. The opposing vertical surfaces 28b are interconnected at a top side and a bottom side of the camera insertion sleeve 28 by inclined surfaces 28c extending between the opposing vertical surfaces 28b. The opposing vertical surfaces 28b constitute lateral sides of the camera insertion sleeve 28. The inclined surfaces 28c are inclined relative to the opposing vertical sides 28b of the camera insertion sleeve 28. When looking in the proximal-distal direction at a cross-section of the camera insertion sleeve 28 taken transversely to the proximal-distal direction PD, the cross-section of the camera insertion sleeve 28 has two opposed vertical sides 28b, defining lateral sides of the camera insertion sleeve 28. The opposing vertical surfaces may be interconnected by a top side and a bottom side of the camera insertion sleeve. The largest extent between the two opposing vertical sides 28b is larger than a largest extent between the top side and bottom side of the camera insertion sleeve 28. The camera assembly 27 comprises surfaces that are complementary to surfaces of the camera insertion sleeve 28.

The camera insertion sleeve comprises guide surfaces in the form of guide elements 28d as disclosed herein.

When the camera assembly 27 is inserted into the camera insertion sleeve 28, there is a spacing between the printed circuit board 33 and the camera insertion sleeve 28. The spacing extends between a majority of the camera assembly 27 and the camera insertion sleeve 28. The guide elements 28d space apart the camera assembly 27 and the camera insertion sleeve 28.

The camera assembly 27 can be slid out of camera insertion sleeve 28 potentially after removing any adhesive and/or sealant provided at the proximal end of the camera assembly 27 and/or between the camera assembly 27 and the camera insertion sleeve 28. The camera insertion sleeve 28 is formed of the same material as the exterior housing 9.

The lens stack 32 further comprises a casing in the form of a lens barrel 32b, positioned between a first light source 30 and the vision sensor 29 of the camera assembly 27, the lens barrel including a light shield configured to substantially prevent light from passing through the casing. The light shield being provided in the form of a light shielding layer provided on the lens barrel 32b.

Figure 5:
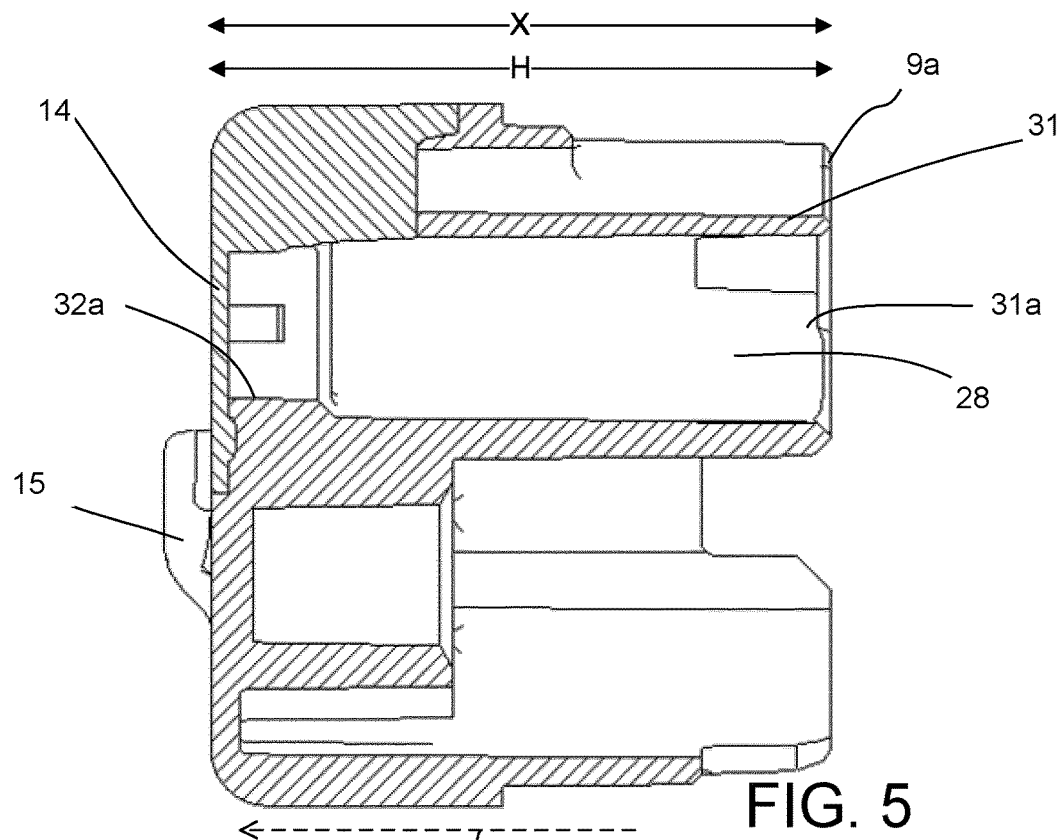
FIG. 5 shows a cross-sectional view of the tip part of FIG. 2 taken along the line A-A in FIG. 3.

The circumferential housing wall 12 extends a total distance H from the distal front wall 11 of the housing 9 to the proximal end 9a of the housing, and the circumferential camera sleeve wall 31 extends a total distance X from the distal front wall 11 of the housing 9 to the proximal end 28a of the camera insertion sleeve 31, wherein the distance X is equal to distance H, see FIG. 5. In other embodiments the distance X is not equal to distance H. The distance X and the circumferential camera sleeve wall 31 extend in parallel with distance H and the circumferential housing wall 12.

The camera insertion sleeve 28 is wider than it is tall and has a total width that is larger than a total height of the camera insertion sleeve. As can be seen in FIG. 3, the total width W is a dimension extending transversely to the proximal-distal direction. The total width W extends between the opposing vertical surfaces 28b. The total height C extends orthogonally to the width, between a top surface and a bottom surface of the camera insertion sleeve 28. The total width W is 1.6 times larger than the total height C of the camera insertion sleeve 28.

The interior surface of the camera insertion sleeve 28 comprises several opposing sides and sub surfaces such as inclined surfaces 28c and opposing vertical surfaces 28b. The light guides 20 are positioned at lateral sides of the camera insertion sleeve and/or lens stack holder.

A cross-section should be understood as a lateral cross-section extending transversely to the proximal-distal direction PD and the circumferential housing wall 12 unless stated otherwise. A lateral cross-sectional shape of the camera insertion sleeve 28 is oblong and bean-shaped. The lateral cross-sectional shape of the camera insertion sleeve 28 comprises a depression 34 near its middle above the lens stack holder 32a when looking from the proximal-distal direction PD. The depression 34 extends from the distal end to the proximal end 28a of the camera insertion sleeve 28.

The camera window 14 is positioned distally of the lens stack holder 32a.

The camera insertion sleeve 28 is positioned at a top of the interior spacing 24. A working channel fluid opening 17 is positioned below the camera insertion sleeve 28.

The total length of the circumferential housing H is less than a largest cross-sectional extent E of the exterior housing 9. The total length H of the circumferential housing wall 12 is equal 0.9 times the largest cross-sectional extent E of the exterior housing 9. The largest cross-sectional extent of the exterior housing 9 is the diameter thereof.

The camera insertion sleeve 28 is fluid tight and fluid sealed from the surrounding portion of the interior spacing 24. The camera insertion sleeve 28 is fluid tight and fluid sealed against the distal front wall 11 and the camera window 14.

The camera insertion sleeve 28 is formed integrally and in one piece with the distal front wall 11 and the camera window 14 and with the circumferential housing wall 12.

As can be seen in FIG. 6, an entirety of the printed circuit board 33 is positioned between the proximal end 31a and the distal end of the camera insertion sleeve 28. The printed circuit board 33 also comprises light sources in the form of LEDs 20. The printed circuit board 33 is attached to the vision sensor 29.

An adhesive and sealant not shown is provided at a proximal end of the printed circuit board 33 of the inserted camera assembly 27 whereby the printed circuit board 33 is fluid sealed in the camera insertion sleeve 28. More specifically, adhesive and sealant is provided between the interior surface of the proximal end 28a of the circumferential camera sleeve wall 31 and the exterior surface of the guide casing 35, see below for further details about the guide casing.

The camera assembly 27 is inserted into the camera insertion sleeve 28 so that the light sources 30 are also positioned within the camera insertion sleeve 28. At least one light source 30 is positioned on one or each side of the lens stack 32.

The light guides 20 are positioned directly in front of the light sources 30 when the camera assembly 27 is inserted into the camera insertion sleeve 28. A light guide is positioned on each side of the camera assembly 27 when the camera assembly 27 is inserted in the camera insertion sleeve 28.

The light sources 30 are positioned within the camera insertion sleeve 28 to abut a light guide 20 when the camera assembly 27 is inserted into the camera insertion sleeve 28.

The lens stack 32 comprises one or more lenses and is arranged between the vision sensor 29 and the camera window 14 within the camera insertion sleeve 28. The lenses are arranged in front of the vision sensor 29 so that an optical axis of the lenses align with an optical axis of the vision sensor 29. The printed circuit board (PCB) 33 has electrical components for converting light received by the camera assembly 27 to an image.

Figure 8:
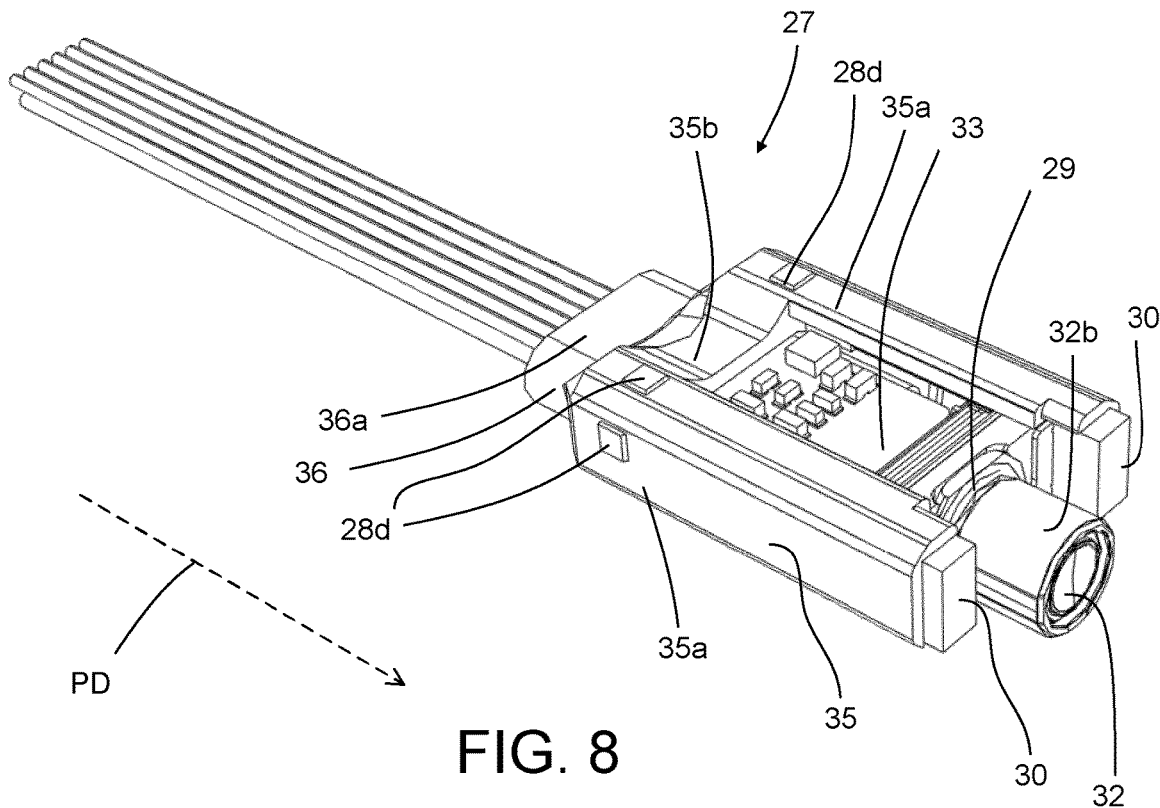
FIG. 8 shows a side perspective view of the camera assembly of FIG. 6 and FIG. 7.
Figure 9:
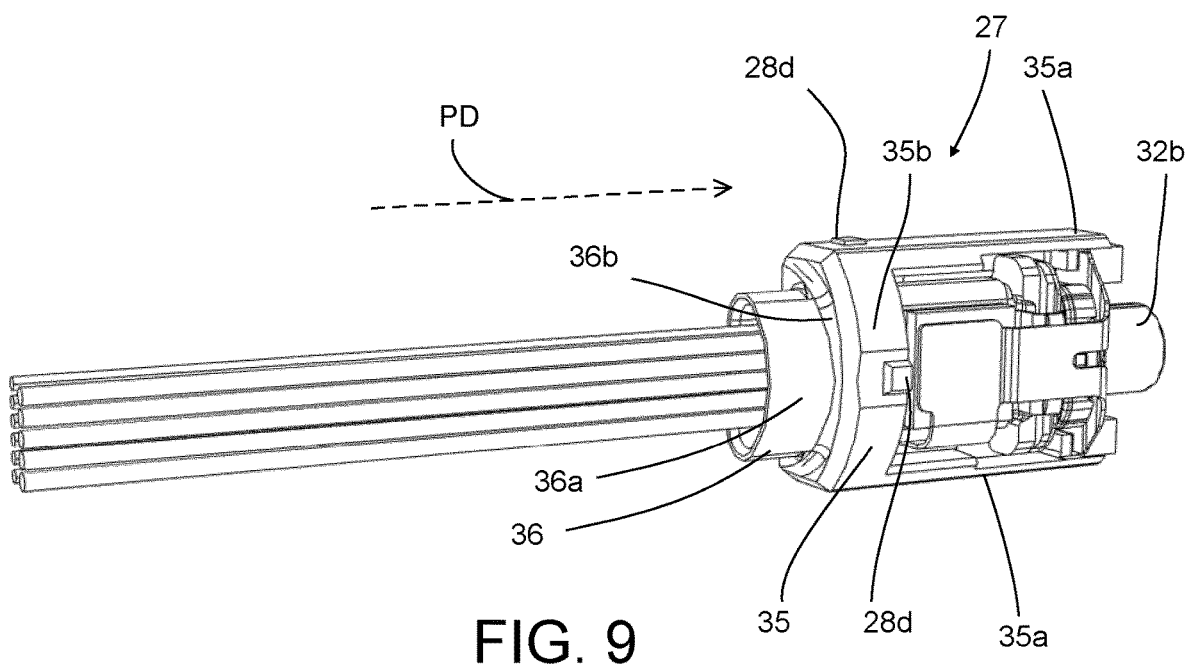
FIG. 9 shows a bottom perspective view of the camera assembly of FIG. 6 and FIG. 7.
Figure 10:
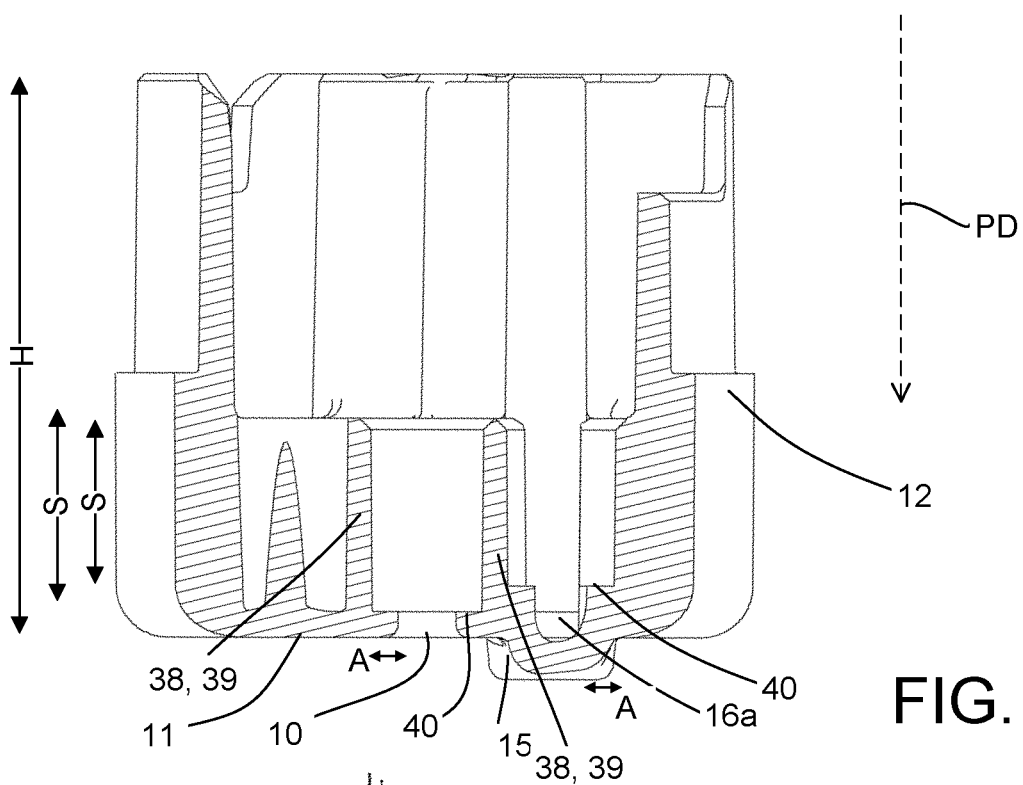
FIG. 10 shows a cross-sectional view of the tip part of FIG. 2 taken along the line B-B in FIG. 3.
Figure 11:
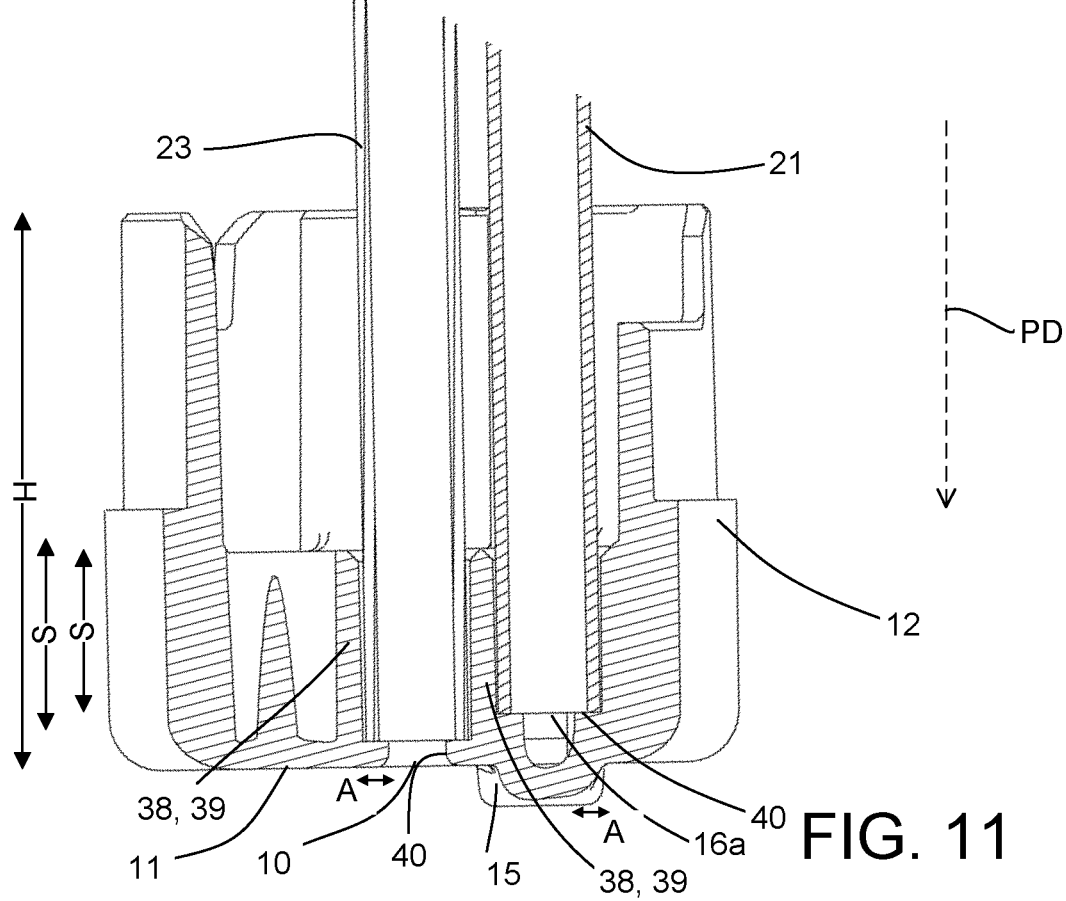
FIG. 11 shows the cross-sectional view of the tip part of FIG. 10 with inserted tubes.
Figure 12:
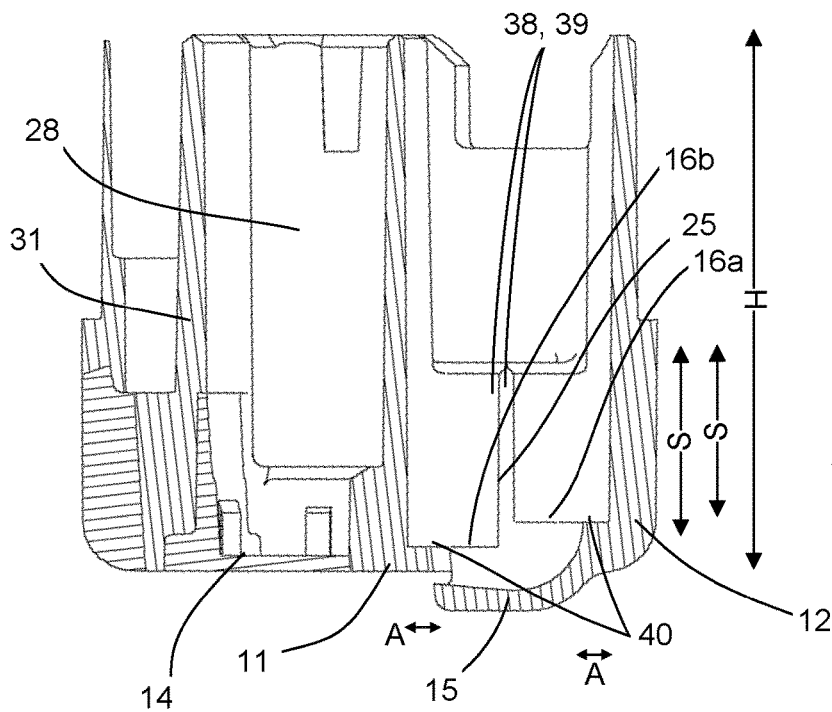
FIG. 12 shows a cross-sectional view of the tip part of FIG. 2 taken along the line C-C in FIG. 3.
Figure 13:
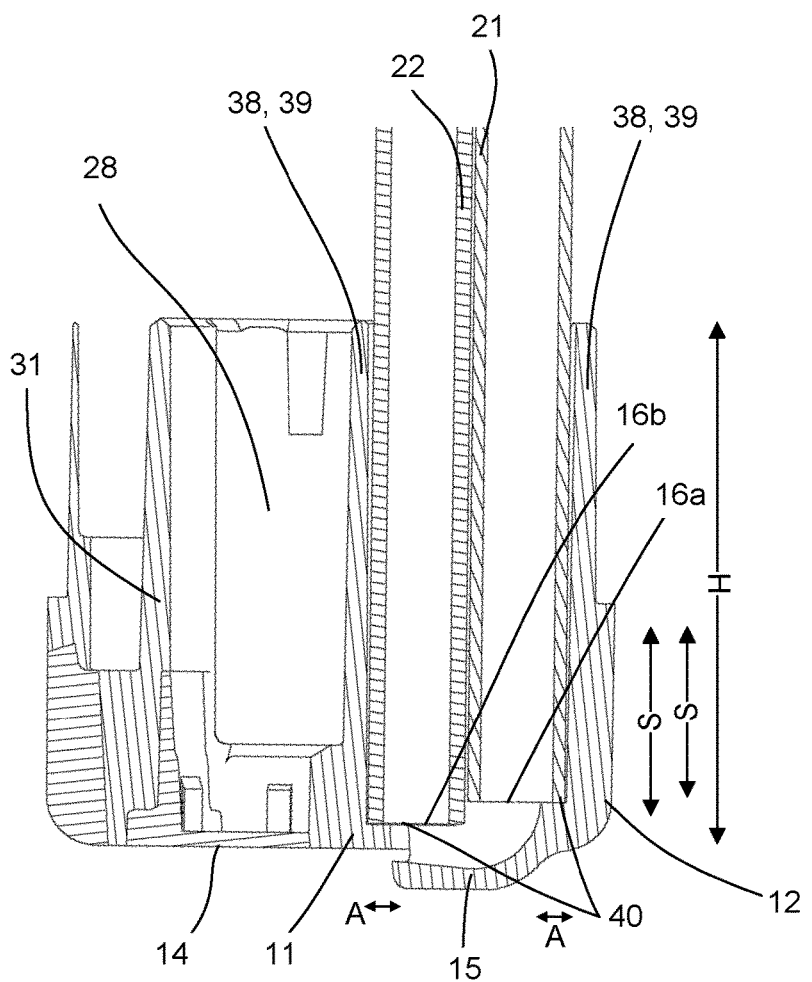
FIG. 13 shows the cross-sectional view of the tip part of FIG. 12 with inserted tubes.
Figure 14:
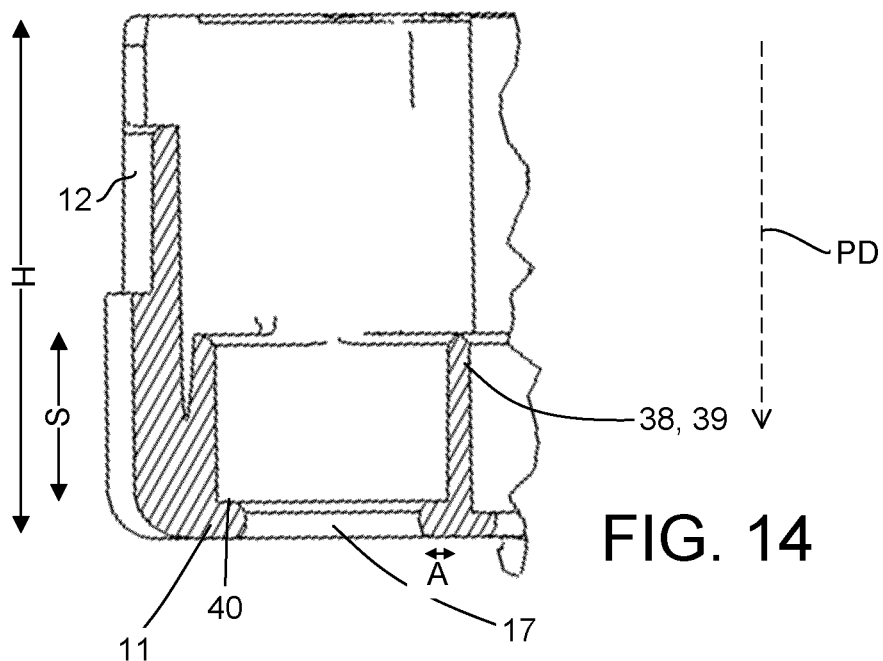
FIG. 14 shows a cross-sectional view of the tip part of FIG. 2 taken along the line D-D in FIG. 3.
Figure 15:
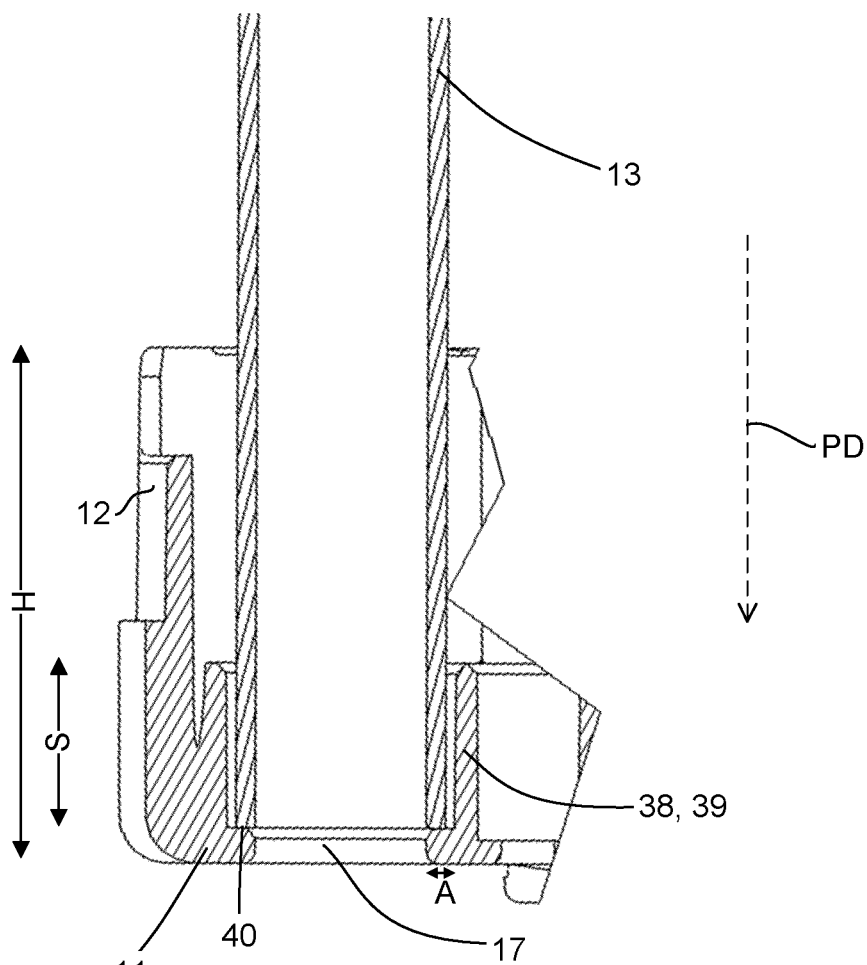
FIG. 15 shows the cross-sectional view of the tip part of FIG. 14 with inserted tube.

As is best seen in FIGS. 8-9, the camera assembly 27 further comprises a guide casing 35 for guiding the camera assembly 27 in the camera insertion sleeve 28. The guide casing 35 comprises an exterior shape that is complementary to the interior shape of the camera insertion sleeve 28. The guide casing 35 is a bushing for inserting into the camera insertion sleeve 28. The guide casing 35 is attached to the camera assembly 27 by an adhesive before insertion of camera assembly 27 into camera insertion sleeve 28.

The guide casing 35 partly encases the camera assembly 27 and extends along the proximal-distal direction of the tip part 2 when inserted in the camera insertion sleeve 28. The guide casing 35 is in the form of a shell comprises an interior shape that is complementary to an exterior shape of the camera assembly 27.

An exterior surface of the guide casing 35 comprises guide elements 28d for guiding the camera assembly 27 during insertion into the camera insertion sleeve 28. The guide elements 28d guide the camera assembly 27 by physically contacting the camera insertion sleeve 28 and by delimiting the spacing within the camera insertion sleeve 28 to position the camera assembly 27. The guide elements 28d guide the camera assembly 27 into a desired position in the camera insertion sleeve 28. The guide elements 28d extend a total length in the proximal-distal direction equal to ⅒ of a total length the guide casing 35 extends in the proximal-distal direction when inserted. The guide elements 28d are positioned on the exterior of the guide casing 35 and on the interior surface of the camera insertion sleeve 28. The guide elements 28d protrude from the interior surface of the camera insertion sleeve 28 and the exterior of the guide casing 35.

The guide casing 35 comprises an exterior shape that is complementary to the interior shape of the camera insertion sleeve 28.

The camera insertion sleeve 28 comprises a first pair of opposing guide elements 28d, the pair of guide elements 28d being positioned on the opposing vertical surfaces 28b such that they face each other.

Being positioned at lateral sides of the camera insertion sleeve 28 the first pair of guide elements 28d guiding lateral sides of the camera assembly 27. This can improve the ease and accuracy of positioning of the camera assembly 27 within the camera insertion sleeve 28. The camera insertion sleeve 28 comprises a second pair of opposing guide elements 28d positioned at a top and a bottom of the camera insertion sleeve 28 for guiding a top and a bottom of the camera assembly 27.

The guide elements 28d of the camera insertion sleeve 28 and the guide casing 35 are formed integrally and in one piece with the camera insertion sleeve 28 and guide casing 35 respectively. The guide elements 35 are molded integrally and in one piece with the camera insertion sleeve 28 and guide casing 35 respectively.

The guide elements 28d protrude from the exterior surface of the guide casing 35. The guide casing 35 comprises a first pair of guide elements 28d positioned on opposite sides of the exterior surface of the guide casing 35 and facing away from each other. The first pair of guide elements 28d are positioned on opposite lateral sides of the guide casing 35. The first pair of guide elements 28d of the guide casing 35 align with and abut the first pair of guide elements 28d of the camera insertion sleeve 28 when the camera assembly 27 is inserted.

The guide casing 35 further comprises two guide elements 28d positioned on a top surface and one guide element 28d bottom surface of the guide casing 35.

Figure 16:
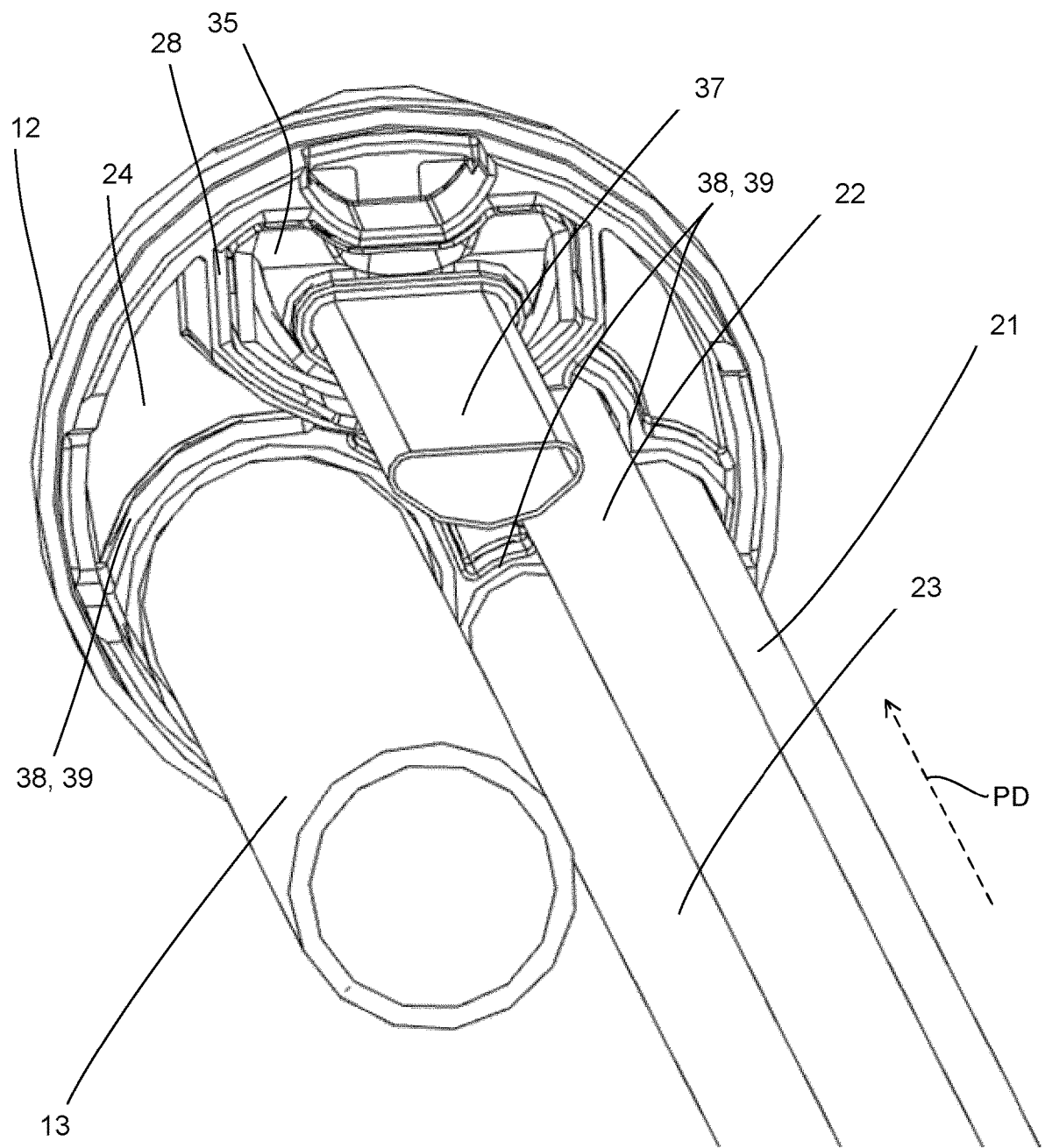
FIG. 16 shows a rear perspective view of the tip part of FIG. 2 with inserted camera assembly and tubes.

The proximal end of the guide casing 35 comprises a cable shield 36, for shielding and protecting the cables extending from the proximal end of the camera assembly 27 and out of the proximal end 28a of the camera insertion sleeve 28. The cable shield 36 completely encloses the cables extending from the proximal end of the camera assembly 27 and out of the proximal end 28a of the camera insertion sleeve 28. The cable shield 36 comprises an attachment surface 36a for a cable sheath 37. A cable sheath 37 can be attached to and sealed against the cable shield 36 whereby the cables may be sealed fluid tight within the cable sheath 37, see FIG. 16. An adhesive and sealant is provided between the cable sheath 37 and the cable shield 36. The cable sheath 37 substantially consists of a fluid tight material. The cable sheath 37 extends from the cable shield 36 to the proximal end of the endoscope 1.

The cable shield 36 further comprises a sealing geometry 36b for sealing against the camera insertion sleeve 28. The sealing geometry 36b is positioned at a proximal end of the camera assembly 27. The sealing geometry 36b seals against the interior surface of the camera insertion sleeve 28. An adhesive and sealant know shown is provided between the sealing geometry 36b and the interior surface of the camera insertion sleeve 28, whereby the camera assembly 37 is fluid sealed in the camera insertion sleeve 28.

The guide casing 35 is substantially U-shaped having two legs 35a which are interconnected by an interconnecting part 35b. The interconnecting part 35b substantially comprises the cable shield 36. The interconnecting part 35b and the two legs 35a are molded integrally and in on piece. The guide casing 35 substantially consists of the first material. The two legs 35a of the guide casing 35 extend on opposite sides of the camera assembly 27. A distal end of each of the two legs 35a abut a respective light source 30 of the camera assembly 27. The two legs 35a extend from a proximal end of the camera assembly 27 along the printed circuit board 33 and the vision sensor 29. The two legs 35a extend substantially in parallel. The two legs 35a are substantially rectangular. The two legs 35a comprise a top side, lateral side, and a bottom side respectively. An exterior surface of the respective lateral sides of the two legs 35a face away from each other. The first pair of guide elements 28d of the guide casing 35 are positioned on an exterior surface of a respective lateral side of each of the two legs. The interconnecting part 35b also comprises three guide elements 28d, two on its top and one on its bottom. The guide elements 28d of the guide casing 35 are molded integrally and in one piece with the guide casing 35.

The lateral cross-section of the guide casing 35 has a complementary shape to the lateral cross-section of the camera insertion sleeve 28. The guide casing 35 comprises a depression 35c complementing the depression 34 of the camera insertion sleeve 28. The interconnecting part 35b of the guide casing 35 comprises the depression 35c.

The tip part 2 further comprises tube insertion sleeves 38 provided within the interior spacing 24 and fixed in relation to the distal front wall 11. The tube insertion sleeves 38 being formed by circumferential tube sleeve walls 39 that extend a total tube sleeve length S from the distal front wall 11 of the housing 8 to a proximal end of the tube insertion sleeves 39 so that the tube insertion sleeves 38 comprise open proximal ends. The distal front wall 11 having fluid openings 10, 16a, 16b, 17 which are aligned with a distal end of the tube insertion sleeves 38, a proximal surface of the distal front wall 11 surrounding the fluid openings 10, 16a, 16b, 17 to provide tube abutment surface 40.

A tube 13, 21, 22, 23 can be inserted through the proximal end of the tube insertion sleeve 38 until a distal end of the tube abuts the tube abutment surface 40, whereby the distal end of the tube is positioned to allow fluid flow through the tube to and through the fluid opening 10, 16a, 16b, 17, see particularly FIGS. 10-15.

The abutment surface 40 circumscribes the fluid openings 10, 16a, 16b, 17. The abutment surface 40 is annular. The width A of the abutment surface 40 is an extent the abutment surface 40 extends from the tube sleeve wall 39 to the fluid opening 10, 16a, 16b, 17. The width A extends substantially perpendicularly to the length S of the tube sleeve wall 39. The width A of the abutment surfaces 40 less than ⅕ the total tube sleeve length S. The width of the abutment surface may be equal to or less than a thickness of an inserted tube. The width A of some of the abutments surfaces 40 is greater than the thickness of the inserted tube 21, 22, 23 and for some is less than the thickness of the inserted tube 13. The width of the abutment surfaces 40 is greater than the thickness of the tube sleeve walls 39. The tube insertion sleeves 38 are formed integrally and in one piece with the exterior housing 9. Some of the circumferential tube sleeve walls 39 are partly formed by the circumferential housing wall 12.

The tip part in the shown embodiment comprises four tube insertion sleeves 38 provided in the interior spacing 24. Each tube insertion sleeve 38 is formed by a circumferential tube sleeve wall 39. The tube insertion sleeves 38 are partly formed by a common circumferential tube sleeve wall 39. The circumferential tube sleeve wall 39 of two of the tube insertion sleeves 38 are partly formed by the circumferential housing wall 12 and partly by a circumferential tube sleeve wall 39 of an adjacent tube insertion sleeve 38.

Two tube insertion sleeves 38 extend side-by-side and include an open slot 25 extending longitudinally between them. The open slot 25 allow for the two tubes 21, 22 to be positioned close to each other along a longitudinal direction when the tubes 21, 22 are positioned in the tube insertion sleeves 38. Parts of the tube insertion sleeves 38 along a longitudinal direction are coinciding. Parts of two of circumferential tube sleeve walls 38 are removed from cut-outs where the tube insertion sleeves 38 intersect each other. Accordingly, outlets from two tubes 21, 22 and open proximal ends of two tube insertion sleeves 38 are shaped like the number "8".

A tube 13, 21, 22, 23 is positioned in each tube insertion sleeve 38. Each tube 13, 21, 22, 23 extends through the tip part 2. Each tube 13, 21, 22, 23 is provided separately from and not in one piece with the exterior housing 9. Liquid tube 21 is for liquid, gas tube 22 is for gas, and rinsing fluid tube 23 is for rinsing fluid. Working channel tube 13 is for the working channel and may be used for fluid supply or extraction, or for insertion of tools or the like.

Positioning of the tubes 13, 21, 22, 23 in the tube insertion sleeves 38 occurs subsequent to manufacture of the exterior housing 9 including tube insertion sleeves 38 and the camera window 14 and the camera insertion sleeve 28. The tubes 13, 21, 22, 23 are inserted into the tube insertion sleeves 38 in a proximal to distal direction, through the proximally positioned opening of the exterior housing 9.

An outer diameter or largest outer cross-section of the outer surface of each tube 13, 21, 22, 23 corresponds to the diameter or largest cross section of each corresponding tube insertion sleeve 38.

The tubes 13, 21, 22, 23 have a constant diameter along their lengths. The tubes 13, 21, 22, 23 are flexible and comprise a plastic or polymer material, such as PET, PE, or PP. The tubes 13, 21, 22, 23 are tubular and cylindrical.

The tip part 2, in particular the tubes 13, 21, 22, 23, are connectable to one or more fluid sources not shown. The fluid provided from the fluid sources may be liquid and/or air or gas. The liquid may be water. The gas may be carbon dioxide. Ejection of liquid from or a liquid jet ejected or sprayed from the nozzle 15 is used for flushing with liquid and thereby cleaning at least part of the front surface of the camera window 14. Ejected gas is used for cleaning remaining liquid on the camera window 14 off after flushing with liquid. The ejected gas is also be used for expanding a body volume. The gas is also used for accelerating or otherwise affecting the liquid flow and the liquid flushing process.

The tube insertion sleeves 38 are tubular having a cylindrical shell. The tube insertion sleeves 38 have a circular cross-section. Some of the tube insertion sleeves 38 have circular end surfaces at their proximal end and distal end. The interior surface of the tube insertion sleeves 38 are complementary to an exterior surface of the tube 13, 21, 22, 23 to be inserted.

The tube insertion sleeves 38 are fluid tight and fluid sealed from the surrounding portion of the interior spacing 24.

The tube insertion sleeves 38 are fluid tight and fluid sealed against the distal front wall 11.

The tube insertion sleeves 38 are formed integrally and in one piece with the distal front wall 11 and the circumferential housing wall 12.

The camera insertion sleeve 28 is positioned at a top of the interior spacing 24. The tube insertion sleeve 38 for the working channel and working channel tube 13 is positioned below the camera insertion sleeve 28. Three tube insertion sleeves are positioned in the lateral spacing next to the working channel tube 13. The camera insertion sleeve 28 and tube insertion sleeve 38 for the working channel tube 13 delimit a lateral spacing within the tip part 2. Tube insertion sleeves 38 for fluid supply and rinsing fluid are positioned in the lateral spacing.

Two of the tube insertion sleeves 38 are partly formed by and coinciding with the camera insertion sleeve 28. The tube insertion sleeves 38 are integrally molded in one piece with the camera insertion sleeve 28.

The tube insertion sleeves 38 are distributed in a cross-section of the exterior housing 9 and next to each other in a radial direction of the distal front wall 11. The tube insertion sleeves 38 are positioned above, below and laterally next to each other in the cross-section of the exterior housing 9. The tube insertion sleeves 38 are positioned such that they partly coincide with each other and some of the tube insertion sleeves partly coincide with the circumferential housing wall 12 and the camera insertion sleeve 28. Two, of the tube insertion sleeves 38 are partly formed by and coinciding with the camera insertion sleeve 28.

The total sleeve lengths S are less than the total housing length H.

The total sleeve lengths S are less than $3/10$ of the total housing length H.

The tube abutment surfaces 40 are less than $3/10$ of the total housing length H from the distal end surface of the distal front wall 11 in the distal-proximal direction.

A tube 13, 21, 22, 23 is inserted in each of the tube insertion sleeves a distal end of the tube abutting the tube abutment surface 40, whereby the distal end of the tube is positioned to allow fluid flow through the tube to and through the fluid opening as seen in FIGS. 11, 13, 15, and 16. The inserted tubes 13, 21, 22, 23 are fluid sealed against the tube insertion sleeves 38 by an adhesive and sealant not shown. The adhesive and sealant are provided at the proximal end of the tube sleeve walls 39 between the inserted tube 13, 21, 22, 23 and the tube sleeve wall 39. The adhesive and sealant are provided between an interior surface of the circumferential tube sleeve wall 39 and an exterior surface of the inserted tube 13, 21, 22, 23. An adhesive and sealant is also provided between the respective abutment surface 40 and the inserted tube 13, 21, 22, 23.

Figure 4:
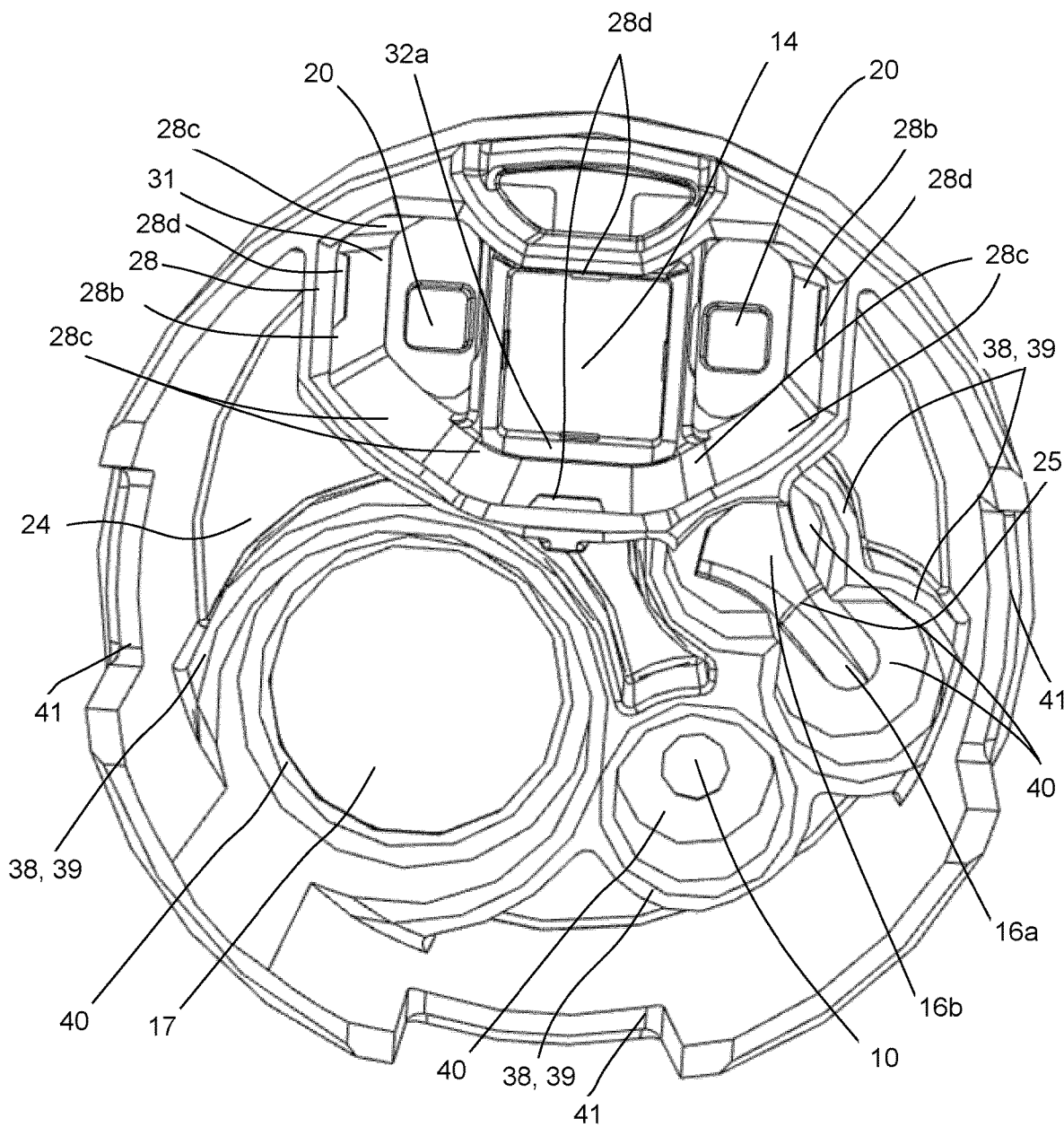
FIG. 4 shows a perspective rear view of the tip part of FIG. 2.

As best seen in FIG. 4, the circumferential tube sleeve walls 39 of two of the tube insertion sleeves 38 are partly formed by and coinciding with the circumferential tube sleeve walls 39 of two other tube insertion sleeves 38.

In a development of the previous embodiment, the circumferential tube sleeve wall 39 of one of tube insertion sleeves 38 is partly formed by and coinciding with the circumferential tube sleeve walls 39 of two other tube insertion sleeves 38 and also at least partly formed by and coinciding with the circumferential housing wall 12. In an embodiment, the tip part further comprises a camera insertion sleeve according to any one of the preceding claims, wherein at least one two of the tube insertion sleeves are partly formed by and coinciding with the circumferential camera sleeve wall 31.

After manufacture of the tip part 2, the tubes are inserted into the tube insertion sleeves 38 through the proximal end of the tube insertion sleeves until a distal end of the tubes 13, 21, 22, 23 abuts the tube abutment surface 40, whereby the distal end of the tubes 13, 21, 22, 23 is positioned to allow fluid flow through the tube 13, 21, 22, 23 to and through the fluid openings 10, 16a, 16b, 17. An adhesive and sealant is then provided between a distal end of the tubes 13, 21, 22,

23 and the abutment surfaces 40 and between an interior surface of the tube insertion sleeves 38 and an exterior surface of the tubes 13, 21, 22, 23.

The circumferential housing wall 12 further comprises three cut-outs 41 extending from the proximal end 9a towards the distal front wall 11. The cut-outs 41 leaving space for constructive elements within the cut-outs, such constructive elements comprising e.g. fixation, such as crimps, of steering wires and alignment elements for alignment of the tip part 2 during manufacture.

The cut-outs 41 are spaced by approximately 80 degrees circumferentially. The cut-outs 41 have a substantially rectangular shape and are different sizes. The cut-outs 41 extend in the proximal distal direction PD more than ¼ of the total housing length H. Each cut-out 41 extends circumferentially equal to or more than ⅒ of a circumference the circumferential housing wall 12.

The tip part 2 is manufactured by an embodiment of the methods ac-cording to this disclosure as described in the following.

First, the front wall 11, the circumferential wall 12, the camera window 14, the nozzle 15, the camera insertion sleeve 28, and the tube insertion sleeves 38 are molded in one piece with each other by means of injection molding in a two-component molding process. A suitable molding tool is provided, and the first polymer material in melted or molten form is introduced into the molding tool. The second polymer material on a melted form is then introduced into the molding tool. The first and second materials are then allowed to set and form an integral component in one unit or one piece. This one piece is then removed or extracted from the molding tool. The molding tool comprises a first cavity, a second cavity, and a core. The first material is allowed to set or partly set before the second material is introduced. As mentioned, the second material is transparent, and it is introduced under higher pressure than the first material. The second material forms the camera window 14, which constitutes only a minor part of the total material of the exterior housing 9. The first material is opaque at least in its set form.

Then, components including the tubes 21, 22, 13a and the camera assembly 27 are inserted in the tube insertion sleeves 38 and camera insertion sleeve respectively in the interior spacing 24 of the exterior housing 9.

Hereby, the exterior housing 9 including the nozzle 15, camera insertion sleeve 28, tube insertion sleeves 38 and the camera window 14 can be manufactured automatically in one single working procedure or working step by means of the two-component injection molding process as described, which saves time and costs in manufacture of the tip part 2. The tubes 13, 21, 22, 23 can then easily be positioned in the tube insertion sleeves 38, and further components, such as the camera assembly 27 can then be inserted in to the camera insertion sleeve 28 positioned within the interior spacing 24 of the exterior housing 9.

LIST OF REFERENCE NUMERALS

1 Endoscope
2 Tip part
3a Distal end
3b Proximal end
4 Insertion tube
4a Outer sheath
5 Handle
6 Working channel inlet
7 Bending section
8 Fluid hose
8a Plug
8b Plug receiver
9 Exterior housing
9a Open proximal end
10 Rinsing fluid opening
11 Distal front wall
12 Circumferential housing wall
12b Step
13 Working channel tube
14 Camera window
14a Exterior surface
15 Nozzle
16a liquid fluid opening
16b gas fluid opening
17 Working channel fluid opening
18 Camera window part
19 Light window part
20 Light guide
21 Liquid tube
22 Gas tube
23 Rinsing fluid tube
24 Interior spacing
25 Slot
26 Display
27 Camera assembly
28 Camera insertion sleeve
28a Proximal end
28b Vertical surfaces
28c Inclined surfaces
28d Guide elements
29 Vision sensor
30 Light source
31 Circumferential camera sleeve wall
32 Lens stack
32a Lens stack holder
32b Lens barrel
33 Printed circuit board (PCB)
34 Depression
35 Guide casing
35a Leg
35b Interconnecting part
35c Depression
36 Cable shield
36a attachment surface
36b Sealing geometry
37 Cable sheath
38 Tube insertion sleeve
39 Circumferential tube sleeve wall
40 Tube abutment surface
41 Cut-out
42 Control lever
43, 44 Control knobs
45 Combined image processing and fluid supply unit
46 Fluid control dials

We claim:
1. A tip part of a disposable insertion endoscope, the tip part comprising:
a housing including:
a proximal end,
a distal end,
a distal front wall, a portion of the distal front wall forming a camera window,
a circumferential housing wall extending from the distal front wall to the proximal end of the housing, the distal front wall and the circumferential housing wall enclosing an interior spacing of the housing, the circumferential housing wall comprising an outer surface and an inner surface, a camera sleeve wall connected to and extending from the distal front wall toward the proximal end of the housing, the camera sleeve wall forming a camera insertion sleeve comprising an open proximal end, and a tube sleeve wall connected to and extending from the distal front wall toward the proximal end of the housing, the tube sleeve wall comprising an inner surface and an outer surface and defining, at least in part, four tube insertion sleeves configured to receive four tubes, portions of the interior spacing formed between the camera sleeve wall, the outer surface of the tube sleeve wall and the inner surface of the circumferential housing wall; and a camera assembly configured to provide an image from light received through the camera window, the camera assembly comprising a vision sensor and a printed circuit board (PCB), wherein at least the vision sensor and a portion of the printed circuit board are positioned in the camera insertion sleeve.

2. The tip part according to claim 1, wherein the camera insertion sleeve is formed integrally and in one piece with the distal front wall and is fluid sealed from a surrounding portion of the interior spacing.

3. The tip part according to claim 1, wherein an entirety of the printed circuit board is positioned within the camera insertion sleeve.

4. The tip part according to claim 1, wherein the camera assembly further comprises one or more light sources also positioned within the camera insertion sleeve.

5. The tip part according to claim 1, wherein the camera assembly further comprises a guide casing for guiding the camera assembly in the camera insertion sleeve, wherein the guide casing comprises an exterior shape that is complementary to an interior shape of the camera insertion sleeve.

6. The tip part according to claim 5, wherein an exterior surface of the guide casing comprises protrusions defining guide elements configured to guide the guide casing during insertion into the camera insertion sleeve.

7. The tip part according to claim 1, wherein an interior surface of the camera insertion sleeve comprises one or more guide elements for guiding the camera assembly during insertion, wherein the one or more guide elements protrude from the interior surface of the camera insertion sleeve.

8. The tip part according to claim 7, wherein the one or more guide elements comprise a first pair of guide elements, the first pair of guide elements being positioned on opposing sides of the interior surface.

9. The tip part according to claim 1,
wherein the circumferential housing wall comprises at least one cut-out extending from the proximal end towards the distal front wall, the at least one cut-out configured to receive constructive elements within the at least one cut-out.

10. The tip part according to claim 1, wherein the camera assembly is sealed against the camera insertion sleeve by an adhesive and/or sealant.

11. The tip part according to claim 1, wherein the camera assembly further comprises a sealing geometry for sealing the camera assembly against the camera insertion sleeve, the sealing geometry selected from the group comprising a sealing surface, a lip, and/or groove.

12. The tip part according to claim 1, further comprising a guide casing adhesively bonded to the camera assembly, wherein an exterior surface of the guide casing comprises protrusions defining casing guide elements, wherein an interior surface of the camera insertion sleeve comprises protrusions defining sleeve guide elements, and wherein the sleeve guide elements and the casing guide elements are configured to place the camera assembly at a desired position in the camera insertion sleeve.

13. The tip part according to claim 1, wherein two of the four tube insertion sleeves extend side-by-side and comprise a longitudinal slot between them, the longitudinal slot reducing a distance between the two tube insertion sleeves.

14. The tip part according to claim 1, wherein two of the four tube insertion sleeves are partly formed by, in one piece, and coinciding with, the camera insertion sleeve.

15. A system comprising:
an endoscope comprising a tip part according to claim 1; and
a display for displaying an image provided by the camera assembly of the endoscope.

16. A tip part of a disposable insertion endoscope, the tip part comprising:
a housing having an open proximal end and a distal end, the housing further having a distal front wall and a circumferential housing wall, the circumferential housing wall extending from the distal front wall to the proximal end of the housing, the distal front wall and the circumferential housing wall enclosing an interior spacing of the housing, a portion of the distal front wall forming a camera window;
a camera insertion sleeve provided within the interior spacing, the camera insertion sleeve being formed by a circumferential camera sleeve wall that extends from the distal end of the housing to a proximal end of the camera insertion sleeve, the camera insertion sleeve comprising an open proximal end;
a camera assembly configured to provide an image from light received through the camera window, the camera assembly comprising a vision sensor and a printed circuit board (PCB); and
a guide casing adhesively bonded to the camera assembly,
wherein at least the vision sensor and a portion of the printed circuit board are positioned in the camera insertion sleeve,
wherein an exterior surface of the guide casing comprises protrusions defining casing guide elements,
wherein an interior surface of the camera insertion sleeve comprises protrusions defining sleeve guide elements, and
wherein the sleeve guide elements and the casing guide elements are configured to place the camera assembly at a desired position in the camera insertion sleeve,
wherein the guide casing comprises legs and an interconnecting part formed in one piece with the legs, the interconnecting part comprising a cable shield, each of the legs comprising a lateral surface, the exterior surface comprising the lateral surfaces of the legs, and
wherein at least some of the casing guide elements protrude from the lateral surfaces.

17. A method of manufacture of a tip part of a disposable insertion endoscope, the method comprising:
providing a housing having an open proximal end and a distal end, the housing further having a distal front wall, a portion of the distal front wall forming a camera window, a circumferential housing wall extending from the distal front wall to the proximal end of the housing, the distal front wall and the circumferential housing wall enclosing an interior spacing of the housing, a camera sleeve wall connected to and extending from the distal front wall toward the proximal end of the housing, the camera sleeve wall forming a camera insertion sleeve comprising an open proximal end, and a tube sleeve wall connected to and extending from the distal front wall toward the proximal end of the housing, the tube sleeve wall defining, at least in part, four tube insertion sleeves configured to receive four tubes, portions of the interior spacing formed between the camera sleeve wall, the tube sleeve wall and the circumferential housing wall;

providing a camera assembly configured to provide an image from light received through the camera window, the camera assembly comprising a vision sensor and a printed circuit board (PCB); and inserting the camera assembly into the camera insertion sleeve from the open proximal end of the camera insertion sleeve until at least the vision sensor and a portion of the printed circuit board are positioned in the camera insertion sleeve.

18. The method according to claim 17, wherein the distal front wall, the circumferential housing wall, and the camera insertion sleeve are integrally molded in one piece with each other.

\* \* \* \* \*